(12) United States Patent
Bowman et al.

(10) Patent No.: US 12,500,881 B2
(45) Date of Patent: Dec. 16, 2025

(54) SYSTEM ARCHITECTURE FOR SECURE HIGHLY AVAILABLE MICROSERVICE APPLICATIONS WITH DECENTRALIZED AUTHORIZATION USING HYBRID ATTRIBUTE AUTHORITY TOKENS USED FOR SECURITY ENFORCEMENT IN CLOUD PLATFORMS

(71) Applicant: THE BOEING COMPANY, Arlington, VA (US)

(72) Inventors: David R. Bowman, Charleston, SC (US); Preston R. Barbare, Mount Pleasant, SC (US); Frank R. Ellis, IV, San Jose, CA (US); Melissa Ohlandt, Charleston, SC (US)

(73) Assignee: THE BOEING COMPANY, Arlington, VA (US)

( * ) Notice: Subject to any disclaimer, the term of this patent is extended or adjusted under 35 U.S.C. 154(b) by 195 days.

(21) Appl. No.: 18/314,281

(22) Filed: May 9, 2023

(65) Prior Publication Data

US 2024/0380743 A1    Nov. 14, 2024

(51) Int. Cl.
H04L 29/06 (2006.01)
H04L 9/40 (2022.01)

(52) U.S. Cl.
CPC ........ *H04L 63/0807* (2013.01); *H04L 63/083* (2013.01); *H04L 63/104* (2013.01); *H04L 63/105* (2013.01); *H04L 63/20* (2013.01)

(58) Field of Classification Search
CPC .... H04L 63/0807; H04L 63/083; H04L 63/20
See application file for complete search history.

(56) References Cited

U.S. PATENT DOCUMENTS

| | | | |
|---|---|---|---|
| 8,806,591 | B2 | 8/2014 | Dallas et al. |
| 8,935,757 | B2 | 1/2015 | Srinivasan et al. |
| 9,800,580 | B2 | 10/2017 | Zhang et al. |
| 10,084,823 | B2 | 9/2018 | Sondhi et al. |
| 10,120,734 | B1 | 11/2018 | Doraiswamy et al. |
| 10,164,956 | B2 | 12/2018 | Toomey |
| 10,382,418 | B1 | 8/2019 | Bar-Menachem et al. |
| 10,887,301 | B1 | 1/2021 | Vera et al. |
| 10,992,657 | B1 | 4/2021 | Stevens et al. |
| 11,082,453 | B2 | 8/2021 | Reddem et al. |
| 11,922,239 | B1 | 3/2024 | Vasudevan |
| 2008/0109874 | A1 | 5/2008 | Kulkarni et al. |
| 2009/0103533 | A1 | 4/2009 | Li et al. |
| 2013/0263211 | A1 | 10/2013 | Neuman et al. |
| 2013/0268768 | A1 | 10/2013 | Corlett |
| 2014/0282972 | A1 | 9/2014 | Fan et al. |
| 2016/0092297 | A1 | 3/2016 | Mazon et al. |
| 2016/0259936 | A1* | 9/2016 | Mukherjee ............ H04L 63/061 |

(Continued)

*Primary Examiner* — Wasika Nipa
(74) *Attorney, Agent, or Firm* — Moore IP Law

(57) ABSTRACT

A device includes one or more processors configured to receive, from a user device, an authentication request including credentials of a user. The one or more processors are also configured to obtain user attributes of the user from one or more user data records associated with one or more identity systems. The one or more processors are further configured to obtain one or more roles of the user based on one or more membership lists. The one or more processors are also configured to generate an authentication token indicating the user attributes and the one or more roles.

15 Claims, 9 Drawing Sheets

Short-Lived Authentication

(56) References Cited

U.S. PATENT DOCUMENTS

| | | |
|---|---|---|
| 2017/0142108 A1 | 5/2017 | Zhang et al. |
| 2017/0149837 A1 | 5/2017 | Sondhi et al. |
| 2017/0257359 A1 | 9/2017 | Ogawa |
| 2017/0302451 A1 | 10/2017 | Wang |
| 2018/0070233 A1 | 3/2018 | Soni et al. |
| 2019/0342280 A1 | 11/2019 | Shaw et al. |
| 2019/0386831 A1 | 12/2019 | Jamkhedkar et al. |
| 2020/0021574 A1 | 1/2020 | Pinner et al. |
| 2020/0382488 A1 | 12/2020 | Liu et al. |
| 2021/0021643 A1* | 1/2021 | Nakagoe ............ H04L 67/34 |
| 2021/0042160 A1 | 2/2021 | Alamouti et al. |
| 2021/0243198 A1 | 8/2021 | Naumann zu Koenigsbrueck et al. |
| 2021/0360034 A1* | 11/2021 | Olden ............ H04L 63/20 |
| 2021/0374747 A1 | 12/2021 | Ederle et al. |
| 2022/0131844 A1 | 4/2022 | Sherlock et al. |
| 2022/0329584 A1 | 10/2022 | Sharma et al. |
| 2024/0089107 A1 | 3/2024 | Akhter et al. |

* cited by examiner

Ingress Mode Based Authentication

SYSTEM ARCHITECTURE FOR SECURE HIGHLY AVAILABLE MICROSERVICE APPLICATIONS WITH DECENTRALIZED AUTHORIZATION USING HYBRID ATTRIBUTE AUTHORITY TOKENS USED FOR SECURITY ENFORCEMENT IN CLOUD PLATFORMS

FIELD OF THE DISCLOSURE

The present disclosure is generally related to system architecture for secure highly available microservice applications with decentralized authorization using hybrid attribute authority tokens used for security enforcement in cloud platforms.

BACKGROUND

An application programming interface (API) gateway facilitates requests that are to be processed by various services. The API gateway can act as a unified entry point to access the services, and can also be used to implement various capabilities such as authentication, traffic management, etc.

If permissions change after a user has been authenticated by the API gateway such that the user is no longer permitted to access a service, a security lapse can occur if the API gateway continues to enable the user to access the service based on the previous authentication. Services can have varying authentication criteria. It can be inconvenient for the user if the API gateway requests different credentials when a user requests access to a different service, or when one service has to access another service on behalf of the user. In some examples, various ingress modes can be used to access the services. Having different gateways for each ingress mode can lead to inconsistent user experience and duplication of resources.

SUMMARY

In a particular implementation, a device includes one or more processors configured to receive an authentication request indicating credentials of a requestor. The one or more processors are also configured to determine, based on the credentials, whether the requestor is authorized. The one or more processors are further configured to, responsive to determining that the requestor is authorized, generate a first authentication token. The one or more processors are also configured to, responsive to determining that the first authentication token has expired, determine whether the requestor remains authorized based on the credentials. The one or more processors are further configured to, responsive to determining that the requestor remains authorized, generate a second authentication token.

In another particular implementation, a method includes receiving, at a device, an authentication request indicating credentials of a requestor. The method also includes determining, based on the credentials, whether the requestor is authorized. The method further includes, responsive to determining that the requestor is authorized, generating a first authentication token. The method also includes, responsive to determining that the first authentication token has expired, determining whether the requestor remains authorized based on the credentials. The method further includes, responsive to determining that the requestor remains authorized, generating a second authentication token.

In another particular implementation, a non-transitory computer readable medium stores instructions that, when executed by one or more processors, cause the one or more processors to receive an authentication request indicating credentials of a requestor. The instructions, when executed by the one or more processors, also cause the one or more processors to determine, based on the credentials, whether the requestor is authorized. The instructions, when executed by the one or more processors, further cause the one or more processors to, responsive to determining that the requestor is authorized, generate a first authentication token. The instructions, when executed by the one or more processors, also cause the one or more processors to, responsive to determining that the first authentication token has expired, determine whether the requestor remains authorized based on the credentials. The instructions, when executed by the one or more processors, further cause the one or more processors to, responsive to determining that the requestor remains authorized, generate a second authentication token.

In another particular implementation, a device includes one or more processors configured to receive, from a user device, an authentication request including credentials of a user. The one or more processors are also configured to obtain user attributes of the user from one or more user data records associated with one or more identity systems. The one or more processors are further configured to obtain one or more roles of the user based on one or more membership lists. The one or more processors are also configured to generate an authentication token indicating the user attributes and the one or more roles.

In another particular implementation, a method includes receiving, from a user device, an authentication request including credentials of a user. The method also includes obtaining user attributes of the user from one or more user data records associated with one or more identity systems. The method further includes obtaining one or more roles of the user based on one or more membership lists. The method also includes generating an authentication token indicating the user attributes and the one or more roles.

In another particular implementation, a non-transitory computer readable medium stores instructions that, when executed by one or more processors, cause the one or more processors to receive, from a user device, an authentication request including credentials of a user. The instructions, when executed by the one or more processors, also cause the one or more processors to obtain user attributes of the user from one or more user data records associated with one or more identity systems. The instructions, when executed by the one or more processors, further cause the one or more processors to obtain one or more roles of the user based on one or more membership lists. The instructions, when executed by the one or more processors, also cause the one or more processors to generate an authentication token indicating the user attributes and the one or more roles.

In another particular implementation, a device includes one or more processors configured to receive, from a first service, a first access request to request access to a second service on behalf of a user, wherein the first access request includes a user identifier of the user and a first service identifier of the first service. The one or more processors are also configured to, based on determining that the user has granted authorization to the first service to access the second service on behalf of the user, generate a proxy authentication token based on the first access request. The one or more processors are configured to send a second access request to the second service, wherein the second access request includes the first service identifier and the proxy authentication token.

In another particular implementation, a method includes receiving, from a first service, a first access request to request access to a second service on behalf of a user, wherein the first access request includes a user identifier of the user and a first service identifier of the first service. The method also includes, based on determining that the user has granted authorization to the first service to access the second service on behalf of the user, generating a proxy authentication token based on the first access request. The method further includes sending a second access request to the second service, wherein the second access request includes the first service identifier and the proxy authentication token.

In another particular implementation, a non-transitory computer readable medium stores instructions that, when executed by one or more processors, cause the one or more processors to receive, from a first service, a first access request to request access to a second service on behalf of a user, wherein the first access request includes a user identifier of the user and a first service identifier of the first service. The instructions, when executed by the one or more processors, also cause the one or more processors to, based on determining that the user has granted authorization to the first service to access the second service on behalf of the user, generate a proxy authentication token based on the first access request. The instructions, when executed by the one or more processors, further cause the one or more processors to send a second access request to the second service, wherein the second access request includes the first service identifier and the proxy authentication token.

In another particular implementation, a device includes one or more processors configured to receive an authentication request from a requestor. The one or more processors are also configured to determine, based on content of the authentication request, an ingress mode of the authentication request. The one or more processors are further configured to select, based on the ingress mode, a particular authentication mode from a plurality of authentication modes. The one or more processors are also configured to generate an authentication token based on the particular authentication mode.

In another particular implementation, a method includes receiving, at a device, an authentication request from a requestor. The method also includes determining, based on content of the authentication request, an ingress mode of the authentication request. The method further includes selecting, based on the ingress mode, a particular authentication mode from a plurality of authentication modes. The method also includes generating, at the device, an authentication token based on the particular authentication mode.

In another particular implementation, a non-transitory computer readable medium stores instructions that, when executed by one or more processors, cause the one or more processors to receive an authentication request from a requestor. The instructions, when executed by the one or more processors, also cause the one or more processors to determine, based on content of the authentication request, an ingress mode of the authentication request. The instructions, when executed by the one or more processors, further cause the one or more processors to select, based on the ingress mode, a particular authentication mode from a plurality of authentication modes. The instructions, when executed by the one or more processors, also cause the one or more processors to generate an authentication token based on the particular authentication mode.

The features, functions, and advantages described herein can be achieved independently in various implementations or may be combined in yet other implementations, further details of which can be found with reference to the following description and drawings.

DETAILED DESCRIPTION

Figure 1:
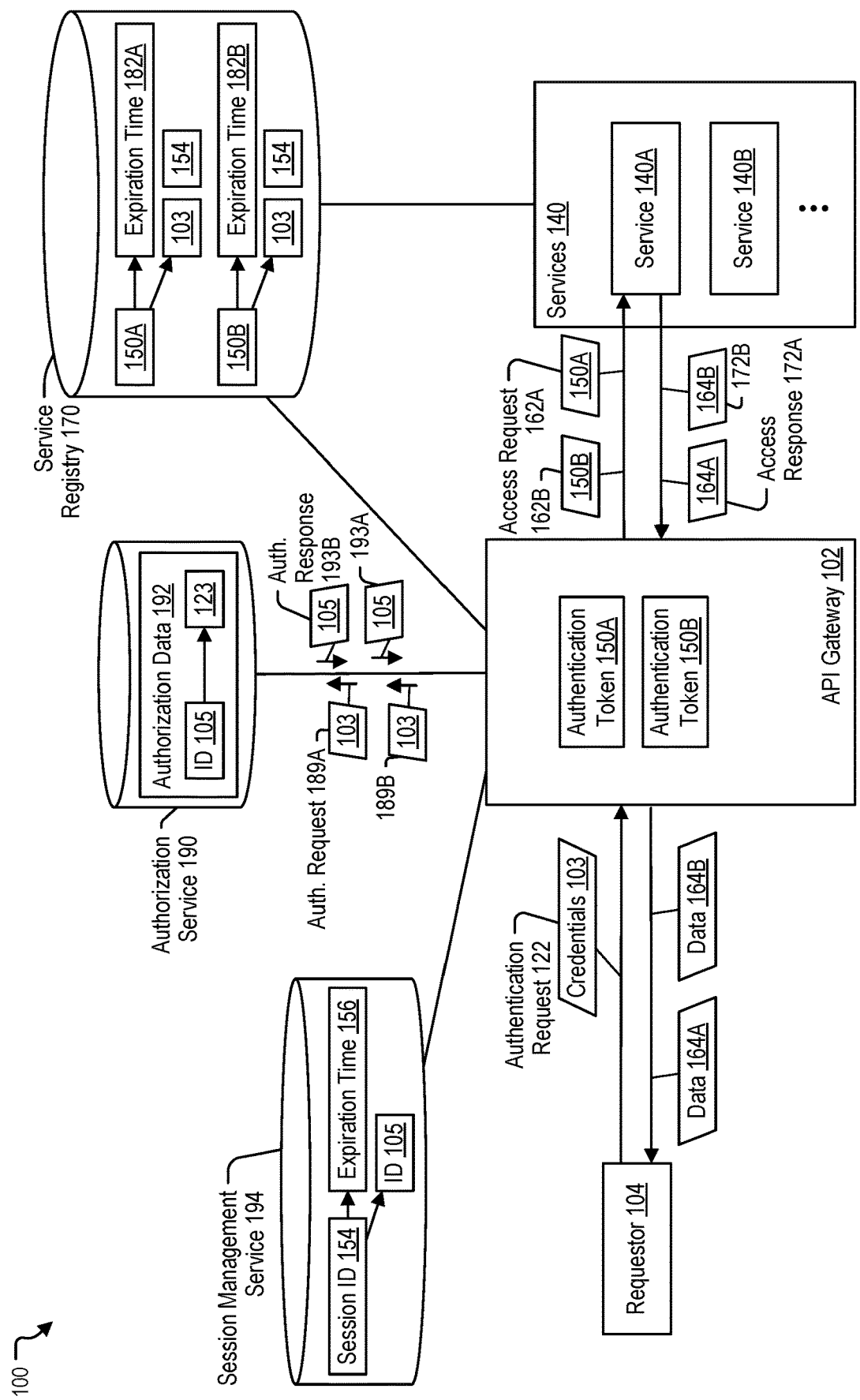
FIG. 1 is a diagram that illustrates a system configured to perform short-lived authentication.

Aspects disclosed herein present systems and methods for short-lived authentication, hybrid authentication, proxy authentication, ingress mode based authentication, or a combination thereof. An API gateway receives an authentication request from a requestor. The requester can include a user, a service, a device, or a combination thereof. The authentication request indicates credentials of the requestor. For example, the credentials can include a username and a password, a certificate, etc. The API gateway determines, based on the credentials, whether the requestor is authorized to use the API gateway to access any of the services.

The API gateway generates a first authentication token in response to determining at a first time that the requestor is authorized. In an example, the API gateway assigns a first expiration time to the first authentication token. Prior to the first expiration time, the API gateway sends, on behalf of the requestor, access requests including the first authentication token to one or more of the services. A service performs the requested access based on determining that the first authentication token has not expired. For example, if the access request corresponds to a data request, the service provides data to the API gateway that the API gateway sends to the requestor.

Subsequent to the first expiration time, the API gateway determines based on the credentials whether the requestor remains authorized. The API gateway generates a second authentication token in response to determining at a second time that the requestor remains authorized. The API gateway assigns a second expiration time to the second authentication token. Subsequent to the first expiration time and prior to the second expiration time, the API gateway sends, on behalf of the requestor, access requests with the second authentication token to one or more of the services. A service performs a requested access based on determining that the second authentication token has not expired. For example, if the access request corresponds to a data request, the service sends data to the API gateway that the API gateway sends to the requestor. The authentication tokens are thus short-lived and re-generated while the requestor remains authorized. A technical advantage of short-lived authentication tokens can include enabling the requestor to access the services while the requestor remains authorized without the requestor having to provide the credentials again.

In a particular example, a service can be attribute-based or role-based. To illustrate, a first service is accessible to users having one or more authorized user roles, and a second service is accessible to users having one or more authorized user attributes. As used herein, a "user attribute" refers to a fact about a user that does not change or that changes rarely, such as a corporate email address, a country of citizenship, etc. As used herein, a "user role" refers to a membership that can be fast changing (e.g., a temporary role), contextual (e.g., a role can be assigned to a person performing a particular task), or both. In this example, the API gateway receives an authentication request associated with a user and generates a hybrid authentication token that indicates user attributes and one or more user roles of the user. For example, the API gateway obtains the user attributes from one or more user data records associated with one or more identity systems. In addition, the API gateway obtains the one or more user roles based on one or more membership lists. The API gateway generates the authentication token indicating the user attributes and the one or more user roles. The API gateway sends, on behalf of the user, access requests indicating the authentication token to one or more of the services.

The first service, in response to receiving an access request from the API gateway including the authentication token, determines whether the user is authorized to access the first service based on the one or more user roles indicated by the authentication token. For example, the first service determines that the user is authorized to access the first service based at least in part on determining that the one or more user roles match the one or more authorized user roles for the first service. The first service, in response to determining that the user is authorized to access the first service, provides data to the API gateway that the API gateway provides to a user device of the user.

The second service, in response to receiving an access request from the API gateway including the authentication token, determines whether the user is authorized to access the second service based on the user attributes indicated by the authentication token. For example, the second service determines that the user is authorized to access the second service based at least in part on determining that the user attributes match the one or more authorized user attributes for the second service. The second service, in response to determining that the user is authorized to access the second service, provides data to the API gateway that the API gateway provides to the user device.

A single hybrid authentication token can thus be used to enable access to services that have different authentication criteria. A technical advantage of the hybrid authentication token can include using fewer resources to maintain a single authentication token instead of separate authentication tokens per authentication criterion.

In some cases, services can be associated with different credentials. To illustrate, a user has first credentials (e.g., a first username and a first password) to access a first service, and second credentials (e.g., a second username and a second password) to access a second service. In an example, the first service has to access the second service on behalf of the user. To illustrate, the first service generates first data for the user based on second data retrieved from the second service. After the user is already authenticated based on the first credentials, it is inconvenient and redundant for the first service to request the user to provide the second credentials for reauthentication to access the second service. Additionally, the user may prefer not to share the second credentials with the first service.

The API gateway can generate a proxy authentication token that the first service can use to access the second service on behalf of the user. To illustrate, the user provides an input to the API gateway granting authorization to the first service to access the second service on behalf of the user. The API gateway, in response to receiving a first access request from the first service to request access to the second service on behalf of the user, determining that the user is authorized to access the second service, and determining that the user has granted authorization to the first service to access the second service, generates a proxy authentication token indicating a user identifier of the user and a first service identifier of the first service. The API sends a second access request including the proxy authentication token to the second service.

The second service, in response to determining that the proxy authentication token has not expired, sends the second data to the API gateway that the API gateway sends to the first service. In some examples, the first service generates first data based on the second data, and sends the first data to the API gateway that the API gateway sends to a user device of the user. A technical advantage of the proxy authentication token can include not having to provide the second credentials to the first service for the first service to access the second service on behalf of the user.

Various ingress modes can be used to access the services. Different ingress modes can be associated with different authentication modes. For example, a first ingress mode that is user-specific (e.g., via a user application) can be associated with a first authentication mode that is based on user credentials (e.g., a user identifier and a password). A second ingress mode that is not user-specific (e.g., a device application) can be associated with a second authentication mode that is based on device credentials (e.g., a certificate).

The API gateway determines an ingress mode of the authentication request based on content of an authentication request, selects an authentication mode that corresponds to the ingress mode, and generates an authentication token based on the selected authentication mode. For example, the API gateway, in response to determining that the authentication request indicates the first authentication mode, determines whether a requestor is authorized based on user credentials (e.g., a username and a password) indicated in the authentication request. Alternatively, the API gateway, in response to determining that the authentication request indicates the second authentication mode, determines whether the requestor is authorized based on device credentials (e.g., a certificate) indicated in the authentication request. A technical advantage of having an API gateway that uses various authentication modes based on detected ingress modes (e.g., as compared to a separate API gateway per ingress mode) can include using fewer resources and providing a similar experience across ingress modes.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple services are illustrated and associated with reference numbers 140A and 140B. When referring to a particular one of these services, such as the service 140A, the distinguishing letter "A" is used. However, when referring to any arbitrary one of these services or to these services as a group, the reference number 140 is used without a distinguishing letter.

Figure 2:
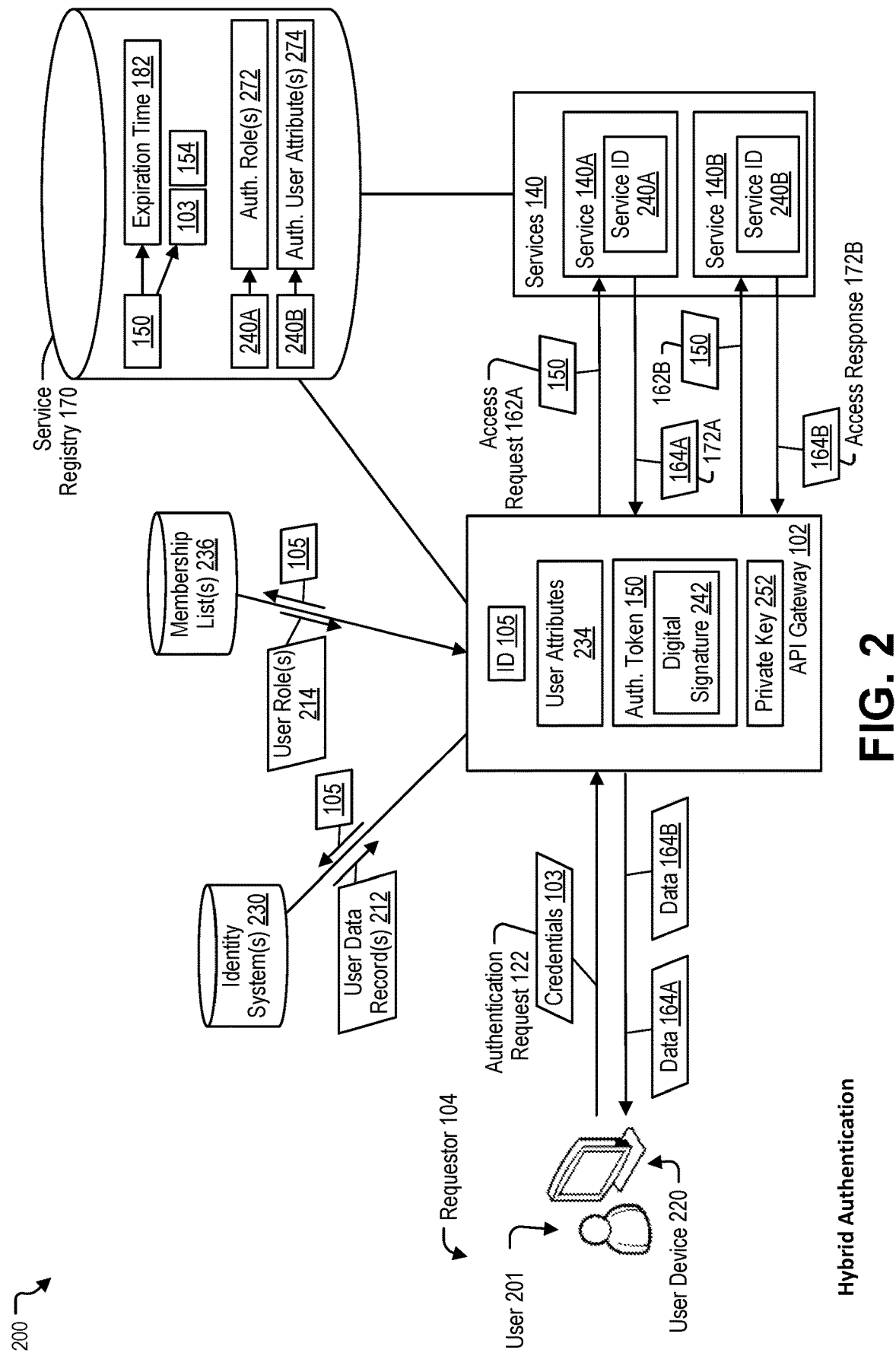
FIG. 2 is a diagram that illustrates a system configured to perform hybrid authentication.

As used herein, various terminology is used for the purpose of describing particular implementations only and is not intended to be limiting. For example, the singular forms "a," "an." and "the" are intended to include the plural forms as well, unless the context clearly indicates otherwise. Further, some features described herein are singular in some implementations and plural in other implementations. To illustrate, FIG. 2 depicts a system 200 including one or more user data records ("user data record(s)" 212 in FIG. 2), which indicates that in some implementations the system 200 includes a single user data record 212 and in other implementations the system 200 includes multiple user data records 212. For case of reference herein, such features are generally introduced as "one or more" features, and are subsequently referred to in the singular unless aspects related to multiple of the features are being described.

The terms "comprise," "comprises." and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first." "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating." "calculating." "using." "selecting." "accessing." and "determining" are interchangeable unless context indicates otherwise. For example, "generating." "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example of a system 100 that is configured to perform short-lived authentication. The system 100 includes an API gateway 102 that is configured to manage access to services 140. For example, the API gateway 102 is configured to manage access by one or more requestors, such as a requestor 104, to one or more of the services 140. In some examples, the API gateway 102 is configured to manage access among the services 140. The services 140 include a service 140A, a service 140B, one or more additional services, or a combination thereof.

The API gateway 102 is configured to be coupled to, or include, a service registry 170, an authorization service 190, a session management service 194, or a combination thereof. The session management service 194 is configured to manage a communication session (e.g., a hypertext transfer protocol (HTTP) session, an internet protocol (IP) session, a transmission control protocol (TCP) session, or another type of session) between a requestor 104 and the API gateway 102. For example, the session management service 194 is configured to maintain data indicating a session identifier 154 of a communication session associated with a requestor 104, an expiration time 156 of the communication session, a requestor identifier 105 of the requestor 104, or a combination thereof.

The authorization service 190 is configured to, in response to receiving an authorization request 189 indicating credentials 103 and based on determining whether the credentials 103 match any of the credentials indicated by authorization data 192, generate an authorization response 193 indicating whether the requestor 104 is authorized. In a particular aspect, the authorization data 192 indicates that credentials 123 are valid for the requestor 104 (having the requestor identifier 105).

The service registry 170 is configured to maintain data associated with authentication tokens 150 to enable the API gateway 102 to manage access to the services 140. In some implementations, an authentication token 150 corresponds to a JavaScript Object Notation (JSON) Web Token (JWT).

The API gateway 102 is configured to, in response to receiving an authentication request 122 indicating the credentials 103 from a requestor 104, use the authorization service 190 to determine whether the requestor 104 is authorized based on the credentials 103 and generate an authentication token 150 for the requestor 104 if the requestor 104 is authorized.

The API gateway 102 is configured to, in response to determining that an authentication token 150 has expired, use the authorization service 190 to determine whether the requestor 104 remains authorized based on the credentials 103 and generate another authentication token 150 if the requestor remains authorized.

The API gateway 102 is configured to send, on behalf of the requestor 104, one or more access requests 162 to the services 140. The API gateway 102 is configured to, select an authentication token 150 that has not expired and include the selected authentication token 150 in the one or more access requests 162. A service 140 is configured to perform the requested access in response to receiving an access request 162 that includes an authentication token 150 and determining that the service registry 170 indicates that the authentication token 150 has not expired. In an example, the access request 162 corresponds to a data request. In this example, the service 140 is configured to send an access response 172 including data 164 to the API gateway 102. The API gateway 102 is configured to send the data 164 to the requestor 104.

The authentication tokens 150 are thus short-lived and re-generated while the requestor 104 remains authorized (e.g., the credentials 103 remain valid). A technical advantage of short-lived authentication tokens can include enabling the requestor 104 to access the services 140 while the requestor 104 remains authorized without the requestor 104 having to provide the credentials 103 again.

During operation, the API gateway 102 receives, from a requestor 104, an authentication request 122 indicating credentials 103 of the requestor 104. In some examples, the API gateway 102 receives the authentication request 122 subsequent to establishment of a communication session with the requestor 104. In other examples, the API gateway 102 receives the authentication request 122 during establishment of the communication session. The session management service 194 includes data indicating that the communication session having a session identifier 154 has an expiration time 156 and is associated with the requestor 104 having the requestor identifier 105. Optionally, in some implementations, the API gateway 102 receives the authentication request 122 independently of a communication session.

In some examples, the requestor 104 includes a user, and the requestor identifier 105 corresponds to a user identifier of the user. In these examples, the credentials 103 are user-specific. To illustrate, the credentials 103 are based on user credentials (e.g., a username and a password) of the user. In some examples, the requestor 104 includes a device, and the requestor identifier 105 corresponds to a device identifier of the device. In these examples, the credentials 103 are device-specific. To illustrate, the credentials 103 can be based on device credentials (e.g., the device identifier, a certificate, or both) of the device.

The API gateway 102 determines, based on the credentials 103, whether the requestor 104 is authorized. For example, the API gateway 102 generates an authorization request 189A indicating the credentials 103 and sends the authorization request 189A to the authorization service 190. The authorization service 190, in response to receiving the authorization request 189A indicating the credentials 103 of the requestor 104, determines whether the authorization data 192 indicates that the requestor 104 is authorized based on the credentials 103.

In some implementations, the authorization service 190 performs a comparison of the credentials 103 with the authorization data 192 (independently of any comparison of the requestor identifier 105) to determine that the requestor 104 is authorized based on the credentials 103. For example, the authorization service 190, in response to determining that the credentials 103 match the credentials 123 indicated by the authorization data 192, generates an authorization response 193A indicating that the requestor 104 is authorized based on the credentials 103. In some examples, the authorization service 190, in response to determining that the credentials 123 are associated with the requestor identifier 105, generates the authorization response 193A including the requestor identifier 105. Alternatively, the authorization service 190, in response to determining that the credentials 103 do not match any of the valid credentials indicated by the authorization data 192, generates the authorization response 193A indicating that the requestor 104 is not authorized.

In some implementations, the authorization service 190 performs a comparison of the requestor identifier 105 and the credentials 103 with the authorization data 192 to determine whether the requestor 104 is authorized based on the credentials 103. For example, the authentication request 122 indicates the credentials 103 and the requestor identifier 105, and the API gateway 102 generates the authorization request 189A to include the requestor identifier 105 and the credentials 103. The authorization service 190, in response to determining that the authorization data 192 indicates that the credentials 123 are associated with the requestor identifier 105 and that the credentials 123 match the credentials 103, generates the authorization response 193A indicating that the requestor 104 is authorized. Alternatively, the authorization service 190, in response to determining that the authorization data 192 does not indicate any credentials associated with the requestor identifier 105 or that the credentials 103 do not match the credentials 123 indicated by the authorization data 192 as associated with the requestor identifier 105, generates the authorization response 193A indicating that the requestor 104 is not authorized based on the credentials 103.

The API gateway 102 selectively generates an authentication token 150A based on the authorization response 193A. For example, the API gateway 102 generates the authentication token 150A in response to determining that the authorization response 193A indicates that the requestor 104 is authorized based on the credentials 103. Alternatively, the API gateway 102, in response to determining that the authorization response 193A indicates that the requestor 104 is not authorized based on the credentials 103, sends an authentication failed indication (not shown in FIG. 1) to the requestor 104.

The API gateway 102 assigns an expiration time 182A to the authentication token 150A when generating the authentication token 150A. For example, the API gateway 102, at a first time, determines the expiration time 182A based on a sum of the first time and a token validity period (e.g., 5 minutes, half an hour, 1 hour, etc.). The token validity period can be based on a configuration setting, default data, a user input, or a combination thereof.

The API gateway 102 stores, at the service registry 170, data indicating that the authentication token 150A has the expiration time 182A and is associated with the credentials 103. In some implementations, the API gateway 102 also stores, at the service registry 170, data indicating that the authentication token 150A is associated with the session identifier 154, the requestor identifier 105, or both.

The API gateway 102 generates one or more access requests 162 on behalf of the requestor 104. In some examples, the authentication request 122 indicates a request from the requestor 104 to access the service 140A and the API gateway 102 generates an access request 162A, an access request 162B, one or more additional access requests, or a combination thereof, at various intervals (e.g., independently of individual requests from the requestor 104). In other examples, the API gateway 102 generates the one or more access requests 162 responsive to receiving corresponding requests from the requestor 104. For example, the requestor 104, subsequent to sending the authentication request 122, sends a first request indicating the service 140A to the API gateway 102. The API gateway 102 generates the access request 162A in response to receiving the first request. Similarly, the requestor 104 subsequently sends a second request indicating the service 140A to the API gateway 102, and the API gateway 102 generates the access request 162B in response to receiving the second request.

Generating the access request 162A on behalf of the requestor 104 includes selecting an authentication token 150 associated with the requestor 104. In some examples, the authentication request 122 with the credentials 103 (and access requests, if any, from the requestor 104) are received during a communication session having the session identifier 154. In some implementations, the API gateway 102, in response to determining that the session management service 194 indicates that the communication session has not ended (e.g., a detected time is less than the expiration time 156), selects the authentication token 150A that is indicated by the service registry 170 as associated with the session identifier 154. In these implementations, the communication session of the requestor 104 that provides the credentials 103 can use the authentication token 150A, and the authentication token 150A is unavailable to any other communication sessions of the requestor 104.

A technical advantage of having the authentication token 150A unavailable to any other communication sessions can include increased security. For example, if a user of a device (e.g., the requestor 104) provides the credentials 103 (e.g., device credentials) during the communication session to access the service 140A, the authentication token 150A is available in that communication session and is unavailable in any other communication session that could be with another user of the device. In some aspects, the API gateway 102, in response to determining that the communication session has ended (e.g., a detected time is greater than or equal to the expiration time 156), removes any authentication tokens (e.g., including the authentication token 150A) associated with the session identifier 154 from the service registry 170.

In other implementations, the API gateway 102 selects the authentication token 150A that is indicated by the service registry 170 as associated with the requestor identifier 105 (e.g., independently of the session identifier 154). In these implementations, the authentication token 150A is available to the requestor 104 independently of any communication sessions. A technical advantage of having the authentication token 150A available to the requestor 104 independently of any communication sessions can include compatibility with stateless communication with the requestor 104 or convenience associated with not having to provide an authentication request 122 indicating the credentials 103 for each communication session. The API gateway 102 selects the authentication token 150A based at least in part on determining that the authentication token 150A has not expired (e.g., a detected time is less than the expiration time 182A).

The API gateway 102 generates an access request 162A indicating the authentication token 150A. In some examples, the access request 162A also indicates the requestor identifier 105 of the requestor 104. The API gateway 102, responsive to determining that the authentication token 150A has not expired (e.g., a detected time is less than the expiration time 182A), sends the access request 162A to the service 140A. The access request 162A can correspond to a data request (e.g., a read request), an edit request (e.g., a write request), an action request, or combination thereof (e.g., read first data, write second data, initiate an action, or a combination thereof).

In some implementations, the service 140A, in response to receiving the access request 162A, determines whether the authentication token 150A has expired. The service 140A, in response to determining that the service registry 170 indicates that the authentication token 150A has not expired (e.g., a detected time is less than the expiration time 182A), generates an access response 172A indicating a result of performing an access indicated by the access request 162A. In an example, the access request 162A corresponds to a data request and the access response 172A indicates data 164A obtained (e.g., generated or retrieved) by the service 140A. In an example, the access request 162A includes a status indicator (e.g., success or failure) of performing the access. For example, the access request 162A corresponds to a data request, and the status indicator indicates a status (e.g., success or failure) of generating the data 164A. In an example, the access request 162A corresponds to an edit request and the access response 172A indicates a result (e.g., success or failure) of performing the edit. In an example, the access request 162A corresponds to an action request and the access response 172A indicates a result (e.g., success or failure) of initiating the action.

The service 140A provides the access response 172A to the API gateway 102. In a particular aspect, the access response 172A includes the requestor identifier 105. The API gateway 102, in response to receiving the access response 172A associated with the requestor 104, sends the data 164A, the status indicator, or both, to the requestor 104. In some implementations, the API gateway 102 uses the session management service 194 to update the expiration time 156 responsive to any communication between the requestor 104 and the API gateway 102 during the communication session.

Subsequently, the API gateway 102 generates an access request 162B based on the authentication request 122 (or an access request from the requestor 104). The API gateway 102, in response to determining that the authentication token 150A has expired (e.g., a detected time is greater than or equal to the expiration time 182A), determines whether the requestor 104 associated with the authentication token 150A remains authorized based on the credentials 103. In an example, the authentication token 150A is associated with the communication session having the session identifier 154. In this example, the API gateway 102, in response to determining that the authentication token 150A has expired and that the communication session having the session identifier 154 has not expired (e.g., a detected time is less than the expiration time 156), determines whether the requestor 104 remains authorized based on the credentials 103.

The API gateway 102 generates an authorization request 189B indicating the credentials 103 and sends the authorization request 189B to the authorization service 190. The authorization service 190 generates an authorization response 193B indicating whether the requestor 104 is authorized based on the credentials 103. For example, the authorization service 190 performs similar operations to generate the authorization response 193B as described with reference to generating the authorization response 193A. To illustrate, the authorization response 193B indicates that the requestor 104 is no longer authorized based on the credentials 103 if authorization of the requestor 104 has been revoked or the credentials 123 associated with the requestor 104 have been changed to no longer match the credentials 103. Alternatively, the authorization response 193B indicates that the requestor 104 remains authorized based on the credentials 103 if the credentials 103 match the credentials 123. The authorization service 190 provides the authorization response 193B to the API gateway 102.

The API gateway 102 selectively generates an authentication token 150B based on the authorization response 193B. For example, the credentials 103 performs similar operations to generate the authentication token 150B based on the authorization response 193B as described with reference to generating the authentication token 150A based on the authorization response 193A. To illustrate, the API gateway 102 generates the authentication token 150B in response to determining that the authorization response 193B indicates that the requestor 104 is authorized based on the credentials 103. Alternatively, the API gateway 102, in response to determining that the authorization response 193B indicates that the requestor 104 is not authorized based on the credentials 103, sends an authentication failed indication (not shown in FIG. 1) to the requestor 104.

The API gateway 102 assigns an expiration time 182B to the authentication token 150B when generating the authentication token 150B. The API gateway 102 stores, at the service registry 170, data indicating that the authentication token 150B has the expiration time 182B and is associated with the credentials 103. In some implementations, the API gateway 102 also stores, at the service registry 170, data indicating that the authentication token 150B is associated with the session identifier 154, the requestor identifier 105, or both.

The API gateway 102 generates one or more access requests 162 on behalf of the requestor 104 that include the authentication token 150B. In some examples, the API gateway 102 selects the authentication token 150B based at least in part on determining that the authentication token 150B is associated with the requestor identifier 105. In some examples, the API gateway 102 selects the authentication token 150B based at least in part on determining that the authentication token 150B is associated with the session identifier 154 and that the communication session has not ended (e.g., a detected time is less than the expiration time 156). In some examples, the API gateway 102 selects the authentication token 150B based at least in part on determining that the authentication token 150B has not expired (e.g., a detected time is less than the expiration time 182B). To illustrate, the API gateway 102 refrains from selecting the authentication token 150A based on determining that the authentication token 150A has expired (e.g., a detected time is greater than or equal to the expiration time 182A).

The API gateway 102 generates an access request 162B indicating the authentication token 150B. In some examples, the access request 162B also indicates the requestor identifier 105 of the requestor 104. The API gateway 102, responsive to determining that the authentication token 150B has not expired (e.g., a detected time is less than the expiration time 182B), sends the access request 162B to the service 140A.

In some implementations, the service 140A, in response to receiving the access request 162B, determines whether the authentication token 150B has expired. The service 140A, in response to determining that the service registry 170 indicates that the authentication token 150B has not expired (e.g., a detected time is less than the expiration time 182B), generates an access response 172B indicating a result of performing an access indicated by the access request 162B. In an example, the access request 162B indicates data 164B obtained (e.g., generated or retrieved) by the service 140A. In an example, the access request 162B includes a status indicator (e.g., success or failure) of performing the access.

The service 140A provides the access response 172B to the API gateway 102. In a particular aspect, the access response 172B includes the requestor identifier 105. The API gateway 102, in response to receiving the access response 172B associated with the requestor 104, sends the data 164B, the status indicator, or both, to the requestor 104.

The authentication tokens 150 are thus short-lived and re-generated while the requestor 104 remains authorized (e.g., while the credentials 103 match the credentials 123). A technical advantage of short-lived authentication tokens can include enabling the requestor 104 to access the services 140 while the requestor 104 remains authorized without the requestor 104 having to provide the credentials 103 again.

The system 100 can include one or more additional components, one or more fewer components, or one or more different components than illustrated in FIG. 1. Optionally, in some implementations, the system 100 includes a load balancer that routes communication between one or more requestors 104 and two or more API gateways 102. For example, a first API gateway 102 can be substituted for a second API gateway 102 transparently to the one or more requestors 104. In these implementations, data at the session management service 194, data at the authorization service 190, data at the service registry 170, or a combination thereof, is available to the two or more API gateways 102. For example, the session management service 194, the authorization service 190, the service registry 170, or a combination thereof, are peered across the two or more API gateways 102.

Although FIG. 1 depicts data stored at the session management service 194, data stored at the authorization service 190, and data stored at the service registry 170, in some implementations the session management service 194, the authorization service 190, the service registry 170, or a combination thereof, access data from one or more storage devices.

Although the API gateway 102, the service registry 170, the authorization service 190, and the session management service 194 are depicted as separate components, in other implementations the described functionality of two or more of the API gateway 102, the service registry 170, the authorization service 190, and the session management service 194 can be performed by a single component. In some implementations, at least one of the API gateway 102, the service registry 170, the authorization service 190, or the session management service 194 can be represented in hardware, such as via an application-specific integrated circuit (ASIC) or a field-programmable gate array (FPGA), or the operations described with reference to one or more of the API gateway 102, the service registry 170, the authorization service 190, or the session management service 194 may be performed by a processor executing computer-readable instructions.

Although FIG. 1 illustrates particular examples for clarity of explanation, such examples are not to be considered as limitations. For example, although the API gateway 102 is described as sending the access request 162A and the access request 162B to the same service (e.g., the service 140A), in other examples the API gateway 102 can send the access request 162A to the service 140A and send the access request 162B to the service 140B. In these other examples, the API gateway 102 receives the access response 172A from the service 140A and receives the access response 172B from the service 140B.

Referring to FIG. 2, a diagram illustrates an example of a system 200 that is configured to perform hybrid authentication. In some aspects, the system 100 of FIG. 1 includes one or more components of the system 200.

The system 200 includes a user device 220 of a user 201. In a particular aspect, the user 201 corresponds to the requestor 104. The API gateway 102 is coupled to, or includes, one or more identity systems 230 and one or more membership lists 236.

The one or more identity systems 230 are configured to store user data records of users. For example, the one or more identity systems 230 are configured to store one or more user data records 212 of the user 201. The one or more user data records 212 indicate user attributes 234 of the user 201. In a particular aspect, the user attributes 234 do not change over time or typically change relatively rarely (e.g., once in a few years). In an illustrative non-limiting example, the user attributes 234 can include a country of birth, a country of citizenship, a country of residence, a date of birth, a race, a gender identity, a name, an employer, a corporate email address, or a combination thereof, of the user 201. In some implementations, a user attribute 234 is indicated by a single value in a user data record 212. In some examples, a user attribute 234 is a particular value (e.g., a country of residence) selected from multiple possible values (e.g., a list of countries).

The one or more membership lists 236 are configured to indicate user roles of users. For example, the one or more membership lists 236 indicate one or more user roles 214 of the user 201. In a particular aspect, the one or more user roles 214 can be relatively fast changing (e.g., a temporary role), contextual (e.g., a role assigned to the user 201 based on a user task), or both. In an illustrative example, a work title (e.g., "software developer") of the user 201 corresponds to a user attribute 234. The user 201 can have various user roles 214, such as a first user role 214 (e.g., an Administrator) on a server, a second user role 214 (e.g., a Maintainer) on a source code repository, one or more additional user roles 214, or a combination thereof.

In some implementations, a membership list 236 corresponding to a user role 214 includes a user identifier (e.g., the requestor identifier 105) of the user 201 to indicate that the user 201 has the user role 214. In some examples, the membership list 236 can include multiple user identifiers of multiple users associated with the user role 214. In some implementations, a membership list 236 is associated with the user 201 and indicates that the user role 214 from among a plurality of available user roles is assigned to the user 201.

In some implementations, the one or more identity systems 230 (e.g., the one or more user data records 212) and the one or more membership lists 236 are associated with two or more business entities. For example, a first user data record 212 is associated with a first business entity, and a first membership list 236 is associated with a second business entity that is distinct from the first business entity.

The services 140 can include one or more first services that are role-based and one or more second services that are attribute-based. For example, the service 140A is a role-based service configured to provide access based on user roles independently of user attributes, and the service 140B is an attribute-based service configured to provide access based on user attributes independently of user roles. To illustrate, the service registry 170 indicates that the service 140A having a service identifier 240A is associated with one or more authorized roles 272. A user having one or more user roles that match the one or more authorized roles 272 is authorized to access the service 140A. The service registry 170 indicates that the service 140B having a service identifier 240B is associated with one or more authorized user attributes 274. A user having one or more user attributes that match the one or more authorized user attributes 274 is authorized to access the service 140B.

The API gateway 102 is configured to generate hybrid authentication tokens. For example, the API gateway 102 is configured to generate an authentication token 150 indicating the user attributes 234 and the one or more user roles 214. The API gateway 102 is configured to send one or more first access requests 162 to the service 140A and one or more second access requests 162 to the service 140B. Each of the one or more first access requests 162 and the one or more second access requests 162 includes the authentication token 150 (e.g., the hybrid authentication token).

The service 140A is configured to generate an access response 172A based on a comparison of the one or more user roles 214 and the one or more authorized roles 272, and to provide the access response 172A to the API gateway 102. Similarly, the service 140B is configured to generate an access response 172B based on a comparison of the user attributes 234 and the one or more authorized user attributes 274, and to provide the access response 172B to the API gateway 102.

A single hybrid authentication token (e.g., the authentication token 150) can thus be used to enable access to the service 140A and the service 140B having different authentication criteria. A technical advantage of the hybrid authentication token can thus include using fewer resources to maintain a single authentication token instead of separate authentication tokens per authentication criterion.

During operation, the API gateway 102 receives, from the user device 220, the authentication request 122 including the credentials 103 of the user 201. The API gateway 102 determines whether the user 201 (e.g., the requestor 104) is authorized based on the credentials 103, as described with reference to FIG. 1. The API gateway 102, in response to determining that the user 201 is authorized based on the credentials 103, provides the requestor identifier 105 (e.g., a user identifier) to the one or more identity systems 230 to retrieve the one or more user data records 212 of the user 201 and obtains the user attributes 234 from the one or more user data records 212. Similarly, the API gateway 102, in response to determining that the user 201 is authorized based on the credentials 103, obtains the one or more user roles 214 that are indicated in the one or more membership lists 236 as associated with the requestor identifier 105 (e.g., the user identifier).

The API gateway 102 generates an authentication token 150 indicating the user attributes 234 and the one or more user roles 214. Optionally, in some implementations, the API gateway 102 generates a digital signature 242 based on a private key 252 (e.g., a private encryption key) of the API gateway 102, and includes the digital signature 242 in the authentication token 150.

In some implementations, the API gateway 102 assigns an expiration time 182 to the authentication token 150, as described with reference to FIG. 1. The authentication token 150 is associated with the requestor identifier 105 (e.g., a user identifier) of the user 201, a communication session having the session identifier 154, or both, as described with reference to FIG. 1. In a particular aspect, the service registry 170 stores data indicating that the authentication token 150 has the expiration time 182, is based on the credentials 103, and is associated with the session identifier 154, the requestor identifier 105, or both, as described with reference to FIG. 1. In a particular aspect, the communication session is with the user 201 of the user device 220. In a particular aspect, the authentication request 122 is received during the communication session. In a particular aspect, the authentication token 150 is available during the communication session to access one or more of the services 140.

The API gateway 102 sends access requests 162 to the services 140, as described with reference to FIG. 1. For example, the API gateway 102 sends one or more first access requests 162 to the service 140A and one or more second access requests 162 to the service 140B on behalf of the user 201. Each of the first access requests 162 and each of the second access requests 162 includes the authentication token 150 (e.g., the hybrid authentication token). Optionally, in some implementations, the API gateway 102, in response to determining that the service registry 170 indicates that the authentication token 150 has expired, refrains from sending any access requests including the authentication token 150. In some implementations, the API gateway 102, in response to determining that the authentication token 150 has expired, generates another authentication token based on the credentials 103, as described with reference to FIG. 1. In other implementations, the API gateway 102, in response to determining that the authentication token 150 has expired, sends an error message to the user device 220 requesting the user 201 to provide credentials again. Alternatively, the API gateway 102, in response to determining that the service registry 170 indicates that the authentication token 150 has not expired, sends an access request 162 including the authentication token 150 to a service 140, as described with reference to FIG. 1.

The service 140A receives the access request 162A including the authentication token 150. Optionally, in some implementations, the service 140A uses a public key (e.g., a public encryption key) of the API gateway 102 to verify whether the digital signature 242 matches the authentication token 150. The service 140A, in response to determining that the digital signature 242 fails to match the authentication token 150, sends an error message to the API gateway 102 indicating an encryption error. Alternatively, the service 140A, in response to determining that the digital signature 242 matches the authentication token 150, generates an access response 172A based on a comparison of the one or more authorized roles 272 and the one or more user roles 214 indicated in the authentication token 150.

In some implementations, the service 140A, in response to determining that at least one of the one or more user roles 214 is included in the one or more authorized roles 272, determines that the one or more user roles 214 match the one or more authorized roles 272. In some implementations, the service 140A, in response to determining that each of the one or more user roles 214 is included in the one or more authorized roles 272, determines that the one or more user roles 214 match the one or more authorized roles 272. In some implementations, the service 140A, in response to determining that each of the one or more authorized roles 272 is included in the one or more user roles 214, determines that the one or more user roles 214 match the one or more authorized roles 272. In some implementations, the service 140A, in response to determining that each of the one or more authorized roles 272 is included in the one or more user roles 214 and each of the one or more user roles 214 is included in the one or more authorized roles 272, determines that the one or more user roles 214 match the one or more authorized roles 272.

The service 140A, in response to determining that the one or more user roles 214 match the one or more authorized roles 272, performs an access (e.g., data access, edit access, or action access) indicated in the access request 162A and generates a status indicator associated with performing the access, as described with reference to FIG. 1. The service 140A generates the access response 172A indicating a result of performing the access (e.g., the data 164A), the status indicator (e.g., success or failure), or both. Optionally, in some implementations, the service 140A performs the access based at least in part on determining that the authentication token 150 has not expired (e.g., a detected time is less than the expiration time 182), as described with reference to FIG. 1. The service 140A generates the access response 172A independently of the user attributes 234 indicated in the authentication token 150.

Similarly, the service 140B receives the access request 162B including the authentication token 150. Optionally, in some implementations, the service 140B uses a public key (e.g., a public encryption key) of the API gateway 102 to verify whether the digital signature 242 matches the authentication token 150. The service 140B, in response to determining that the digital signature 242 fails to match the authentication token 150, sends an error message to the API gateway 102 indicating an encryption error. Alternatively, the service 140B, in response to determining that the digital signature 242 matches the authentication token 150, generates an access response 172B based on a comparison of the one or more authorized user attributes 274 and the user attributes 234 indicated in the authentication token 150.

In some implementations, the service 140B, in response to determining that at least one of the user attributes 234 is included in the one or more authorized user attributes 274, determines that the user attributes 234 match the one or more authorized user attributes 274. In some implementations, the service 140B, in response to determining that each of the user attributes 234 is included in the one or more authorized user attributes 274, determines that the user attributes 234 match the one or more authorized user attributes 274. In some implementations, the service 140B, in response to determining that each of the one or more authorized user attributes 274 is included in the user attributes 234, determines that the user attributes 234 match the one or more authorized user attributes 274. In some implementations, the service 140B, in response to determining that each of the one or more authorized user attributes 274 is included in the user attributes 234 and each of the user attributes 234 is included in the one or more authorized user attributes 274, determines that the user attributes 234 match the one or more authorized user attributes 274.

In some implementations, the service 140B, in response to determining that the user attributes 234 match the one or more authorized user attributes 274, performs an access (e.g., data access, edit access, or action access) indicated in the access request 162B and generates a status indicator associated with performing the access, as described with reference to FIG. 1. The service 140B generates the access response 172B indicating a result of performing the access (e.g., the data 164B), the status indicator (e.g., success or failure), or both. Optionally, in some implementations, the service 140B performs the access in response to determining that the authentication token 150 has not expired (e.g., a detected time is less than the expiration time 182), as described with reference to FIG. 1. The service 140B generates the access response 172B independently of the one or more user roles 214 indicated in the authentication token 150.

The API gateway 102, in response to receiving the access response 172A from the service 140A, provides the data 164A, the status indicator included in the access response 172A, or both, to the user device 220. Similarly, the API gateway 102, in response to receiving the access response 172B from the service 140B, provides the data 164B, the status indicator included in the access response 172B, or both, to the user device 220.

A single hybrid authentication token (e.g., the authentication token 150) can thus be used to enable access to the service 140A and the service 140B having different authentication criteria. A technical advantage of the hybrid authentication token can thus include using fewer resources to maintain a single authentication token instead of separate authentication tokens per authentication criterion.

Figure 3:
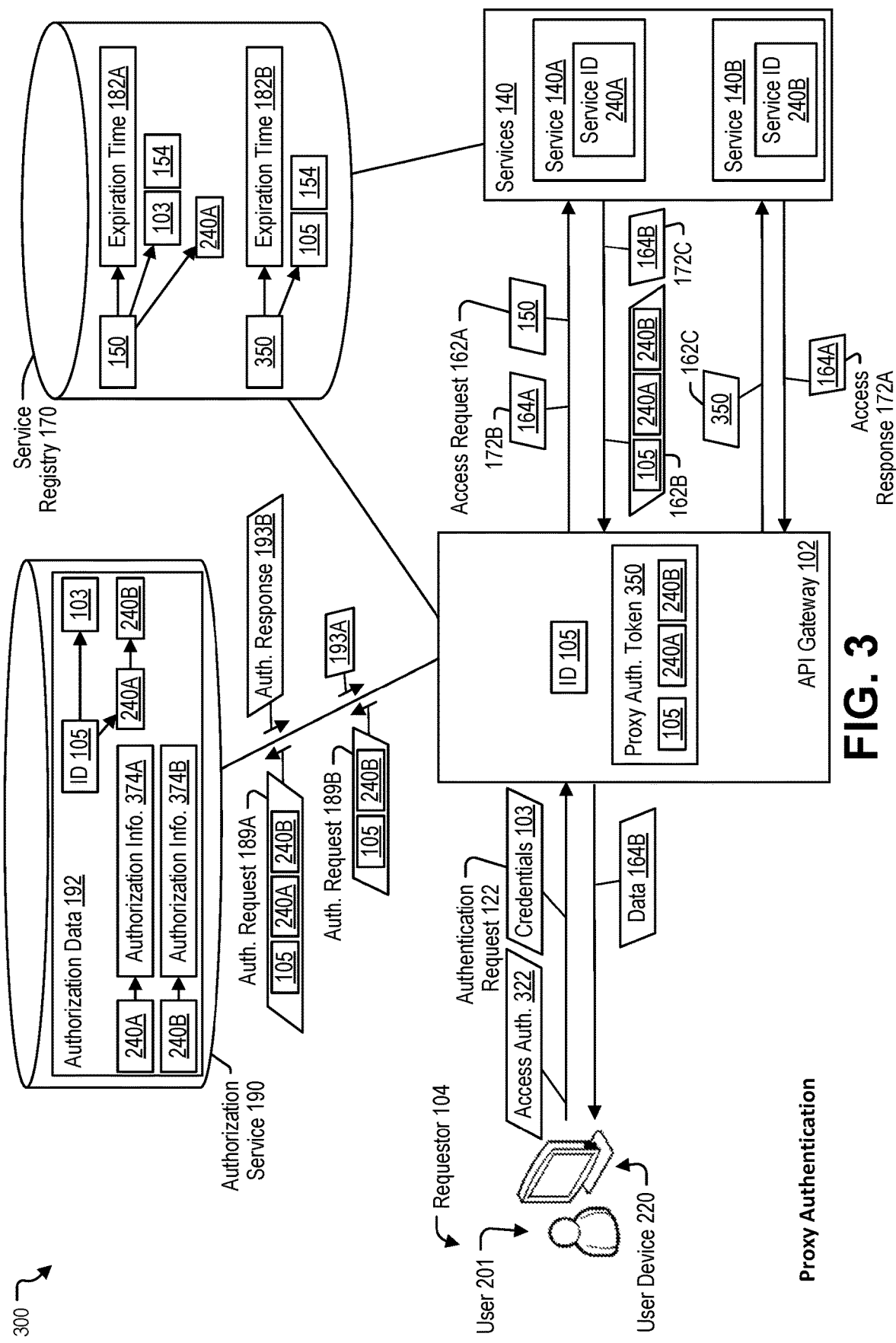
FIG. 3 is a diagram that illustrates a system configured to perform proxy authentication.

Referring to FIG. 3, a diagram illustrates an example of a system 300 that is configured to perform proxy authentication. In some aspects, the system 100 of FIG. 1, the system 200 of FIG. 2, or both, include one or more components of the system 300.

The API gateway 102 is configured to maintain the authorization data 192 at the authorization service 190 indicating whether a user 201 has authorized one or more of the services 140 to access one or more others of the services 140 on behalf of the user 201. The authorization data 192 at the authorization service 190 also includes authorization information 374A of the service 140A having the service identifier 240A, and authorization information 374B of the service 140B having the service identifier 240B. The authorization information 374A indicates a first authentication criterion associated with the service 140A, and the authorization information 374B indicates a second authentication criterion associated with the service 140B.

The API gateway 102 is configured to, in response to receiving an access request 162 from one of the services 140 (e.g., the service 140A) requesting access to another one of the services 140 (e.g., the service 140B), determining that the authorization data 192 indicates that the user 201 is authorized to access the service 140B, and determining that the user 201 has previously authorized the service 140A to access the service 140B on behalf of the user 201, use a proxy authentication token 350 to access the service 140B.

In some examples, the service 140A is accessible using first credentials (e.g., the credentials 103) of the user 201, and the service 140B is accessible using second credentials that are distinct from the first credentials. A technical advantage of using the proxy authentication token 350 to access the service 140B can thus include not having to provide the second credentials to the service 140A for the service 140A to access the service 140B on behalf of the user 201.

During operation, the API gateway 102 receives, from the user device 220, an authentication request 122 indicating the credentials 103 of the user 201 (e.g., the requestor 104). In some examples, the authentication request 122 also indicates the service 140A (e.g., the service identifier 240A). In some implementations, the API gateway 102 uses the authorization service 190 to update the authorization data 192 to indicate that the user 201 (having the requestor identifier 105) is associated with the credentials 103.

The API gateway 102, in response to receiving the authentication request 122 indicating the service 140A, determines whether the user 201 is authorized to access the service 140A based on the credentials 103. For example, the API gateway 102 sends an authorization request (not shown in FIG. 3) to the authorization service 190 indicating the credentials 103 and the service 140A (e.g., the service identifier 240A). The authorization service 190, in response to determining that the credentials 103 match the authorization information 374A of the service 140A (having the service identifier 240A), provides an authentication response (not shown in FIG. 1) to the API gateway 102 indicating that the user 201 is authorized to access the service 140A based on the credentials 103.

The API gateway 102 generates an authentication token 150 in response to determining, based on the authentication response, that the user 201 is authorized to access the service 140A based on the credentials 103. The API gateway 102 stores the authentication token 150 in the service registry 170. In a particular aspect, the API gateway 102 updates the service registry 170 to indicate that the authentication token 150 is associated with a communication session (having the session identifier 154), the requestor identifier 105, or both, as described with reference to FIG. 1. In a particular aspect, the API gateway 102 assigns an expiration time 182A to the authentication token 150, as described with reference to FIG. 1.

In a particular aspect, the API gateway 102 updates the service registry 170 to indicate that the authentication token 150 is associated with (e.g., is based on) the credentials 103. In some implementations, the API gateway 102, in response to determining that the user 201 is authorized based on the credentials 103 to access the service 140A, updates the service registry 170 to indicate that the authentication token 150 is associated with the service 140A (having the service identifier 240A).

The API gateway 102 receives, from the user device 220, an access authorization 322 indicating that the user 201 authorizes the service 140A to access the service 140B on behalf of the user 201. The API gateway 102, in response to receiving the access authorization 322, sends an authorization request 189A indicating the user 201 (e.g., the requestor identifier 105), the service 140A (e.g., the service identifier 240A) and the service 140B (e.g., the service identifier 240B) to the authorization service 190. The authorization service 190, in response to receiving the authorization request 189A, updates the authorization data 192 to indicate that the user 201 (e.g., having the requestor identifier 105) has granted authorization to the service 140A (having the service identifier 240A) to access the service 140B (having the service identifier 240B) on behalf of the user 201.

The API gateway 102 sends one or more access requests 162 to the service 140A on behalf of the requestor 104 (e.g., the user 201), as described with reference to FIG. 1. For example, the API gateway 102, in response to determining that the authentication token 150 is associated with (e.g., is valid for) the user 201, the communication session, or both, that the authentication token 150 has not expired (e.g., a detected time is less than the expiration time 182A), and that the authentication token 150 is associated with the service 140A, includes the authentication token 150 in an access request 162A to the service 140A.

The service 140A generates an access request 162B to request access to the service 140B on behalf of the user 201. For example, the service 140A uses the access request 162B to request data from the service 140B. In another example, the service 140A uses the access request 162B to edit data at the service 140B. In yet another example, the service 140A uses the access request 162B to have the service 140B initiate an action. In some examples, the service 140A generates the access request 162B responsive to receiving the access request 162A. To illustrate, the service 140A has to access the service 140B to satisfy the access request 162A.

The access request 162B includes a user identifier (e.g., the requestor identifier 105) of the user 201, the service identifier 240A of the service 140A (e.g., the requesting service), and the service identifier 240B of the service 140B (e.g., the requested service). The service 140A sends the access request 162B to the API gateway 102.

The API gateway 102, in response to receiving the access request 162B from the service 140A to request access to the service 140B on behalf of the user 201, determines whether a proxy authentication token 350 is to be generated responsive to the access request 162B. For example, the API gateway 102 determines whether the user 201 is an authorized user of the service 140B. To illustrate, the API gateway 102 sends an authorization request 189B to the authorization service 190. The authorization request 189B includes a user identifier (e.g., the requestor identifier 105) of the user 201 and the service identifier 240B of the service 140B.

The authorization service 190, in response to receiving the authorization request 189B, generates an authorization response 193B indicating whether the user 201 (having the requestor identifier 105) is an authorized user of the service 140B (having the service identifier 240B). For example, the authorization service 190, in response to determining that the authorization information 374B does not indicate that the user 201 (having the requestor identifier 105) is authorized to access the service 140B, generates the authorization response 193 indicating that the user 201 is not an authorized user of the service 140B. Alternatively, the authorization service 190, in response to determining that the authorization information 374B indicates that the user 201 (having the requestor identifier 105) is authorized to access the service 140B with second credentials, generates the authorization response 193B indicating that the user 201 (having the requestor identifier 105) is an authorized user of the service 140B (having the service identifier 240B).

The API gateway 102, in response to determining that the authorization response 193B indicates that the user 201 is not an authorized user of the service 140B, determines that the proxy authentication token 350 is not to be generated responsive to the access request 162B. Alternatively, the API gateway 102, in response to determining that the authorization response 193 indicates that the user 201 is an authorized user of the service 140B, and that the authorization data 192 indicates that the user 201 has previously granted authorization to the service 140A to access the service 140B on behalf of the user 201, generates the proxy authentication token 350 based on the access request 162B.

Because the identity of the user 201 has already been verified using the credentials 103 and the user 201 is an authorized user of the service 140B, the API gateway 102 generates the proxy authentication token 350 to enable access to the service 140B on behalf of the user 201 independently of the second credentials. In some implementations, the API gateway 102 generates the proxy authentication token 350 based on determining that the authorization is granted by the user 201 prior to receipt of the access request 162B.

If the API gateway 102 determines that the proxy authentication token 350 is not to be generated responsive to the access request 162B, the API gateway 102 provides a first error message to the service 140A indicating that access is denied to the service 140B on behalf of the user 201. In some implementations, the service 140A, in response to receiving the first error message, sends a second error message to the API gateway 102 and the API gateway 102 sends the second error message to the user device 220. For example, the second error message indicates that the service 140A is denied access to the service 140B on behalf of the user 201. In some implementations, the service 140A, in response to receiving the first error message, performs other error handling in addition to or as an alternative to sending the second error message to the API gateway 102.

Generating the proxy authentication token 350 based on the access request 162B includes generating the proxy authentication token 350 to indicate the user identifier (e.g., the requestor identifier 105) of the user 201, the service identifier 240A of the service 140A (e.g., the requesting service), the service identifier 240B of the service 140B (e.g., the requested service), or a combination thereof. In some implementations, the API gateway 102 assigns an expiration time 182B to the proxy authentication token 350, and stores data in the service registry 170 indicating that the proxy authentication token 350 has the expiration time 182B. The API gateway 102 stores data in the service registry 170 indicating that the proxy authentication token 350 is associated with the communication session (having the session identifier 154), the user 201 (having the requestor identifier 105), or both.

In some implementations, the API gateway 102 stores data in the service registry 170 indicating that the proxy authentication token 350 is associated with the user 201 being authorized to access the service 140A based on the credentials 103. For example, the API gateway 102, in response to determining that the proxy authentication token 350 has expired (e.g., a detected time is greater than or equal to the expiration time 182B), that the user 201 remains authorized to access the service 140A based on the credentials 103, that the authorization data 192 still indicates that the user 201 has granted authorization to the service 140A to access the service 140B on behalf of the user 201, and that the user 201 remains an authorized user of the service 140B, generates a new proxy authentication token (e.g., increases the expiration time 182B of the proxy authentication token 350).

The API gateway 102, in response to receiving the access request 162B and determining that the proxy authentication token 350 has not expired (e.g., a detected time is less than the expiration time 182B), sends an access request 162C including the proxy authentication token 350 to access the service 140B on behalf of the user 201. The service 140B, in response to receiving the access request 162C including the proxy authentication token 350, performs an access (e.g., data access, edit access, or action access) indicated in the access request 162C and generates a status indicator associated with performing the access, as described with reference to FIG. 1. Optionally, in some implementations, the service 140B performs the access in response to determining that the proxy authentication token 350 indicates the service identifier 240B, that the service registry 170 indicates that the proxy authentication token 350 has not expired (e.g., a detected time is less than the expiration time 182B), or both.

The service 140B generates an access response 172A indicating a result (e.g., data 164A) of performing the access, the status indicator (e.g., success or failure), or both. The service 140B generates the access response 172A independently of the user 201 providing the second credentials to access the service 140B. The service 140B provides the access response 172A to the API gateway 102.

The API gateway 102, in response to receiving the access response 172A, generates an access response 172B based on the access response 172A and provides the access response 172B to the service 140A. In an example, the access response 172B includes the data 164A, the status indicator, or both.

In some implementations, the service 140A performs one or more operations based on the access response 172B (e.g., the data 164A, the status indicator, or both). For example, the service 140A generates data 164B, performs an edit, initiates an action, or a combination thereof, based on the data 164A, the status indicator, or both. In some examples, the service 140A generates an access response 172C based on the access response 172B. For example, the access response 172C includes the data 164B, a status indicator (e.g., success or failure) of performing the one or more operations, or both. The service 140A provides the access response 172C to the API gateway 102. In a particular aspect, the API gateway 102, in response to receiving the access response 172C, provides the data 164B, a status indicator included in the access response 172C, or both, to the user device 220.

A technical advantage of using the proxy authentication token 350 to access the service 140B on behalf of the user 201 can thus include not having to provide second credentials to the service 140A for the service 140A to access the service 140B on behalf of the user 201.

Figure 4:
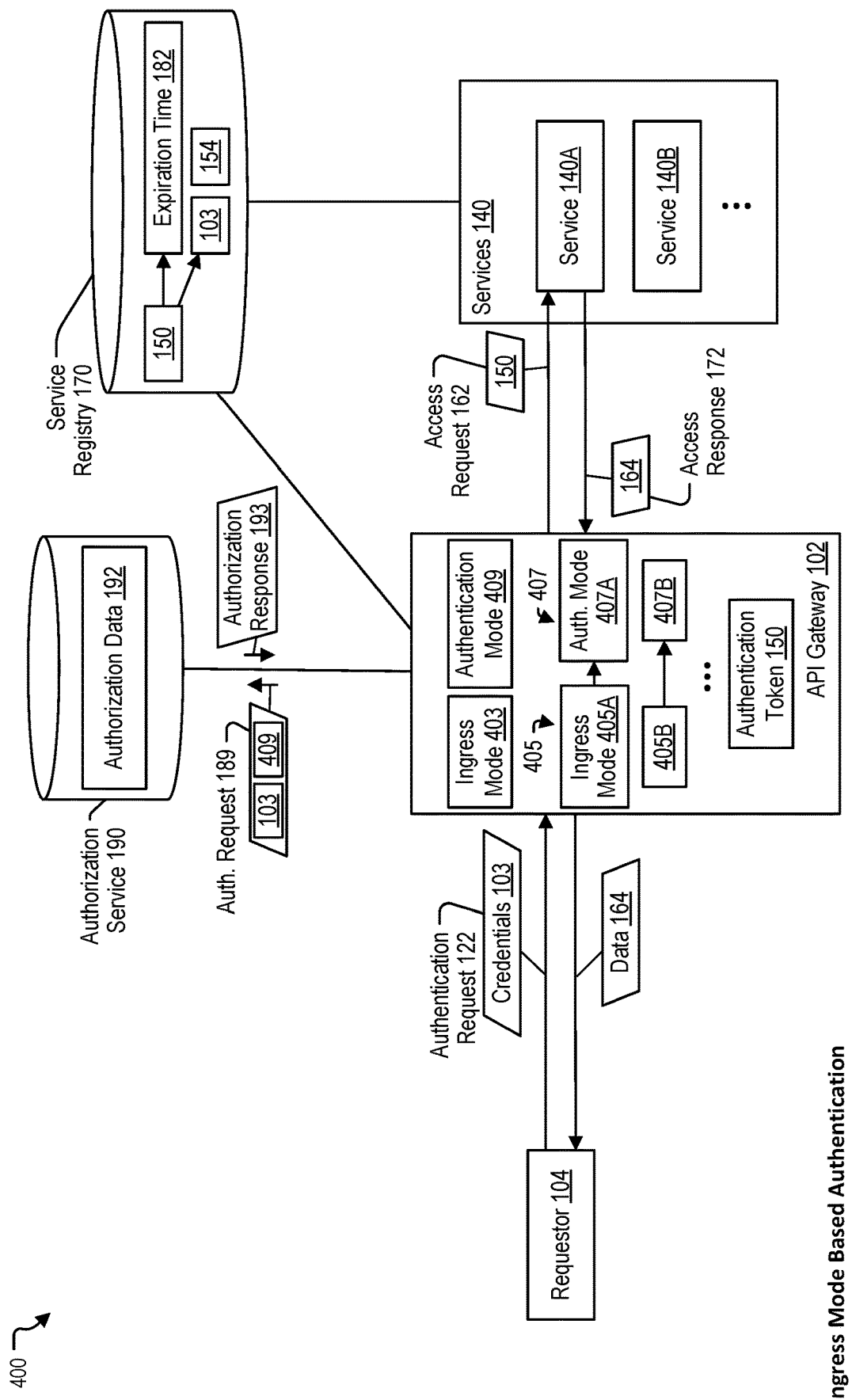
FIG. 4 is a diagram that illustrates a system configured to perform ingress mode based authentication.

Referring to FIG. 4, a diagram illustrates an example of a system 400 that is configured to perform ingress mode based authentication. In some aspects, the system 100 of FIG. 1, the system 200 of FIG. 2, the system 300 of FIG. 3, or a combination thereof, include one or more components of the system 400.

The API gateway 102 is configured to be accessed using one or more of a plurality of ingress modes 405 that are associated with a plurality of authentication modes 407. In an example, the ingress modes 405 include an ingress mode 405A, an ingress mode 405B, one or more additional ingress modes, or a combination thereof. In an example, the authentication modes 407 include an authentication mode 407A, an authentication mode 407B, one or more additional authentication modes, or a combination thereof.

In some implementations, the authentication modes 407 include at least two of a first authentication mode based on a user identifier and a password, a second authentication mode based on a first certificate, a third authentication mode based on a second certificate and an access portal identity token, a fourth authentication mode based on a third certificate, a web service gateway identifier, and a web service gateway user identifier, or a fifth authentication mode based on a fourth certificate and a proxy token for a user. For example, in some implementations, the authentication modes 407 include at least a first authentication mode based on a user identifier and a password, and a second authentication mode based on a certificate. As another example, in some implementations, the authentication modes 407 include at least two of a first authentication mode based on a first certificate and an access portal identity token, a second authentication mode based on a second certificate, a web service gateway identifier, and a web service gateway user identifier, and a third authentication mode based on a third certificate and a proxy token for a user.

The API gateway 102 is configured to, based on an ingress mode 405 of an authentication request 122, select a corresponding one of the authentication modes 407 as a selected authentication mode 409 and authenticate the requestor 104 of the authentication request 122 using the selected authentication mode 409. A technical advantage of the API gateway 102 using various authentication modes based on detected ingress modes (e.g., as compared to a separate API gateway per ingress mode) can include using fewer resources and providing a similar experience across ingress modes.

During operation, the API gateway 102 receives, from a requestor 104, an authentication request 122 indicating credentials 103 of the requestor 104. The API gateway 102 determines, based on content of the authentication request 122, an ingress mode 403 of the authentication request 122. In an example, the API gateway 102, based at least in part on determining that the content of the authentication request 122 indicates that the authentication request 122 is generated at a first network (e.g., an internal network), determines that the ingress mode 403 corresponds to an ingress mode 405A. Alternatively, the API gateway 102, based at least in part on determining that the content of the authentication request 122 indicates that the authentication request 122 is generated at a second network (e.g., an external network), determines that the ingress mode 403 corresponds to an ingress mode 405B. In another example, the API gateway 102, based at least in part on determining that the content of the authentication request 122 is user-specific, determines that the ingress mode 403 corresponds to an ingress mode 405A. Alternatively, the API gateway 102, based at least in part on determining that the content of the authentication request 122 is not user-specific, determines that the ingress mode 403 corresponds to an ingress mode 405B. It should be understood that internal network/external network and user-specific/non user-specific are provided as illustrative examples of factors to determine the ingress mode 403, in other implementations there can be various other factors to determine the ingress mode 403.

The API gateway 102 selects, based on the ingress mode 403, one of the plurality of authentication modes 407 as a selected authentication mode 409. In some implementations, the API gateway 102 has access to mode mapping data that includes mappings between the ingress modes 405 and the authentication modes 407. For example, the mode mapping data indicates that an ingress mode 405A maps to an authentication mode 407A, an ingress mode 405B maps to an authentication mode 407B, one or more additional ingress modes 405 map to one or more authentication modes 407, or a combination thereof.

In an example, the API gateway 102 selects the authentication mode 407A as the selected authentication mode 409 in response to determining that the ingress mode 403 matches the ingress mode 405A and that the ingress mode 405A maps to the authentication mode 407A. Alternatively, the API gateway 102 selects the authentication mode 407B as the selected authentication mode 409 in response to determining that the ingress mode 403 matches the ingress mode 405B and that the ingress mode 405B maps to the authentication mode 407B.

The API gateway 102 is configured to, based on an ingress mode 405 of an authentication request 122, select a corresponding one of the authentication modes 407 as a selected authentication mode 409 and authenticate the requestor 104 of the authentication request 122 using the selected authentication mode 409. For example, the API gateway 102 generates an authorization request 189 indicating the credentials 103 and the selected authentication mode 409 and provides the authorization request 189 to the authorization service 190. The authorization service 190, in response to receiving the authorization request 189 and determining that the authorization request 189 indicates the selected authentication mode 409, uses the selected authentication mode 409 to determine whether the requestor 104 is authorized based on the credentials 103.

When the selected authentication mode 409 is based on user credentials (e.g., a user identifier and a password), the authorization service 190 determines that the requestor 104 is authorized in response to determining that the credentials 103 match valid user credentials (e.g., a valid user identifier and a valid password) indicated by the authorization data 192. When the selected authentication mode 409 is based on a certificate, the authorization service 190 determines that the requestor 104 is authorized based on the credentials 103 in response to determining that the credentials 103 match a valid certificate indicated by the authorization data 192. For example, when the selected authentication mode 409 is based on a certificate and an access portal identity token, the authorization service 190 determines that the requestor 104 is authorized in response to determining that the credentials 103 match a valid certificate and a valid access portal identity token indicated by the authorization data 192. As another example, when the selected authentication mode 409 is based on a certificate, a web service gateway identifier, and a web service gateway user identifier, the authorization service 190 determines that the requestor 104 is authorized in response to determining that the credentials 103 match a valid certificate, a valid web service gateway identifier, and a valid web service gateway user identifier indicated by the authorization data 192.

In an example, when the selected authentication mode 409 is based on a certificate and a proxy authentication token for a user, the authorization service 190 determines that the requestor 104 is authorized in response to determining that the credentials 103 match a valid certificate and a valid proxy token indicated by the authorization data 192. The authorization service 190 generates an authorization response 193 indicating whether the requestor 104 is authorized based on the credentials 103 and provides the authorization response 193 to the API gateway 102.

The API gateway 102, in response to determining that the authorization response 193 indicates that the requestor 104 is not authorized, generates an authentication error message and provides the authentication error message to the requestor 104. Alternatively, the API gateway 102 generates an authentication token 150 in response to determining that the authorization response 193 indicates that the requestor 104 is authorized, as described with reference to FIG. 1. For example, the authentication token 150 has an expiration time 182, is based on the credentials 103, and is associated with the session identifier 154, the requestor identifier 105, or both, as described with reference to FIG. 1.

The API gateway 102 sends one or more access requests 162 to one or more of the services 140 on behalf of the requestor 104, as described with reference to FIG. 1. Each of the one or more access requests 162 includes the authentication token 150. In an example, the API gateway 102 sends an access request 162 including the authentication token 150 to the service 140A. The service 140A, in response to receiving the access request 162, generates an access response 172 based on the access request 162, as described with reference to FIG. 1. For example, the service 140A, in response to determining that the service registry 170 indicates that the authentication token 150 has not expired (e.g., a detected time is less than the expiration time 182), performs an access indicated by the access request 162. The service 140A generates the access response 172 indicating a result of performing the access (e.g., data 164), a status indicator (e.g., success or failure) of performing the access, or both.

The service 140A provides the access response 172 to the API gateway 102. In some examples, the API gateway 102, in response to receiving the access response 172, provides the result of performing the access (e.g., the data 164), the status indicator, or both, to the requestor 104.

A technical advantage of having the API gateway 102 using various authentication modes based on detected ingress modes (e.g., as compared to a separate API gateway per ingress mode) can include using fewer resources and providing a similar experience across ingress modes.

Figure 5:
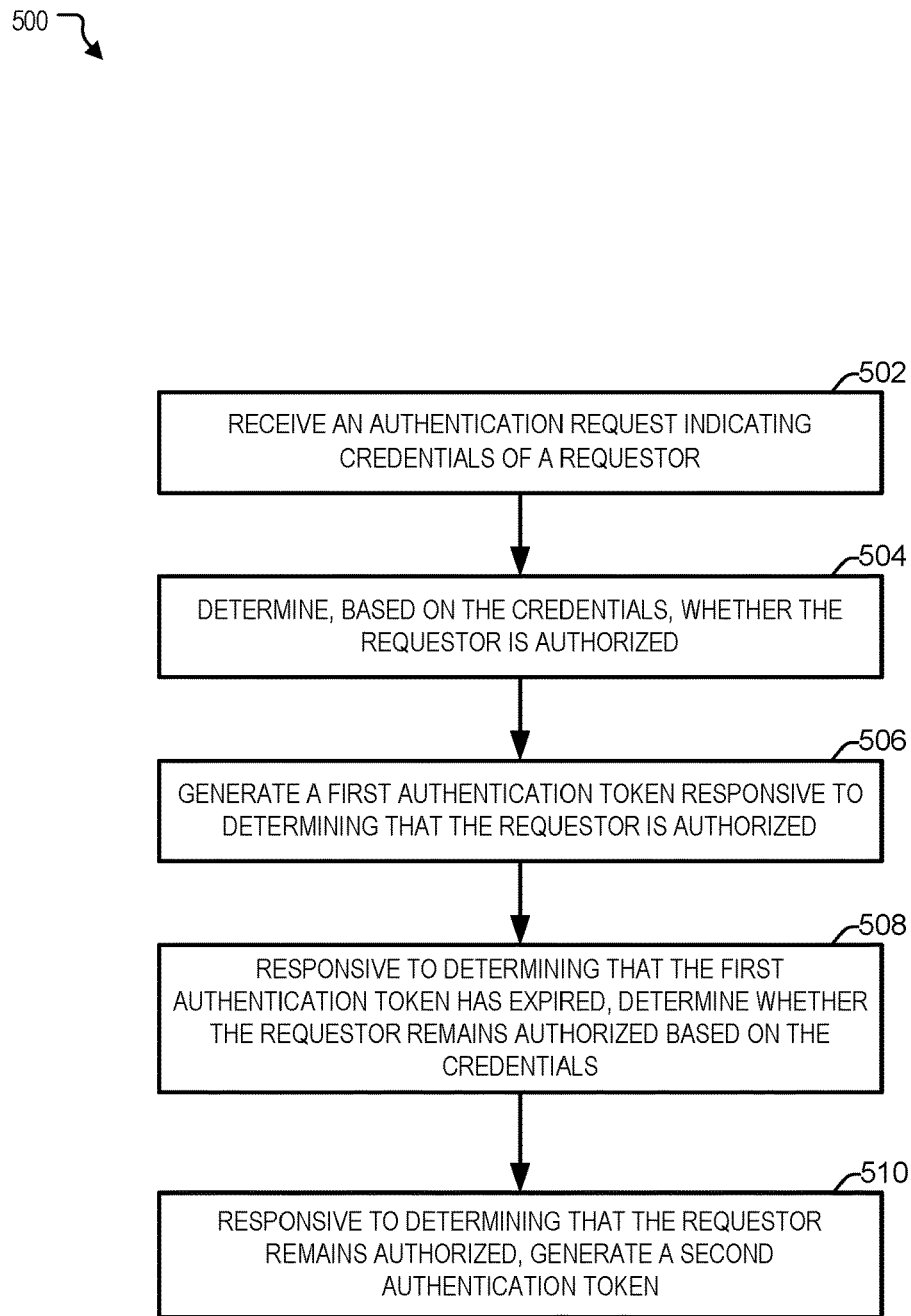
FIG. 5 is a diagram that illustrates a flow chart of an example of a method of short-lived authentication.

Referring to FIG. 5, a particular implementation of a method 500 of short-lived authentication is shown. In a particular aspect, one or more operations of the method 500 are performed by at least one of the API gateway 102, the authorization service 190, the service registry 170, the session management service 194, or a combination thereof.

The method 500 includes receiving an authentication request indicating credentials of a requestor, at 502. For example, the API gateway 102 receives the authentication request 122 indicating the credentials 103 of the requestor 104, as described with reference to FIG. 1.

The method 500 also includes determining, based on the credentials, whether the requestor is authorized, at 504. For example, the API gateway 102 determines, based on the credentials 103, whether the requestor 104 is authorized, as described with reference to FIG. 1. To illustrate, the API gateway 102 generates an authorization request 189A indicating the credentials 103 and provides the authorization request 189A to the authorization service 190. The API gateway 102, responsive to sending the authorization request 189A to the authorization service 190, receives an authorization response 193A indicating whether the requestor 104 is authorized based on the credentials 103.

The method 500 further includes generating a first authentication token responsive to determining that the requestor is authorized, at 506. For example, the API gateway 102 generates the authentication token 150A responsive to determining that the requestor 104 is authorized, as described with reference to FIG. 1.

The method 500 also includes, responsive to determining that the first authentication token has expired, determining whether the requestor remains authorized based on the credentials, at 508. For example, the API gateway 102, responsive to determining that the authentication token 150A has expired, determines whether the requestor 104 remains authorized based on the credentials 103, as described with reference to FIG. 1. To illustrate, the API gateway 102 generates an authorization request 189B indicating the credentials 103 and provides the authorization request 189B to the authorization service 190. The API gateway 102, responsive to sending the authorization request 189B to the authorization service 190, receives an authorization response 193B indicating whether the requestor 104 remains authorized based on the credentials 103.

The method 500 further includes generating a second authentication token responsive to determining that the requestor remains authorized, at 510. For example, the API gateway 102 generates the authentication token 150B responsive to determining that the requestor 104 remains authorized, as described with reference to FIG. 1.

The authentication tokens 150 are thus short-lived and re-generated while the requestor 104 remains authorized. A technical advantage of short-lived authentication tokens can include enabling the requestor 104 to access the services 140 while the requestor 104 remains authorized based on the credentials 103 without the requestor 104 having to provide the credentials 103 again.

Figure 6:
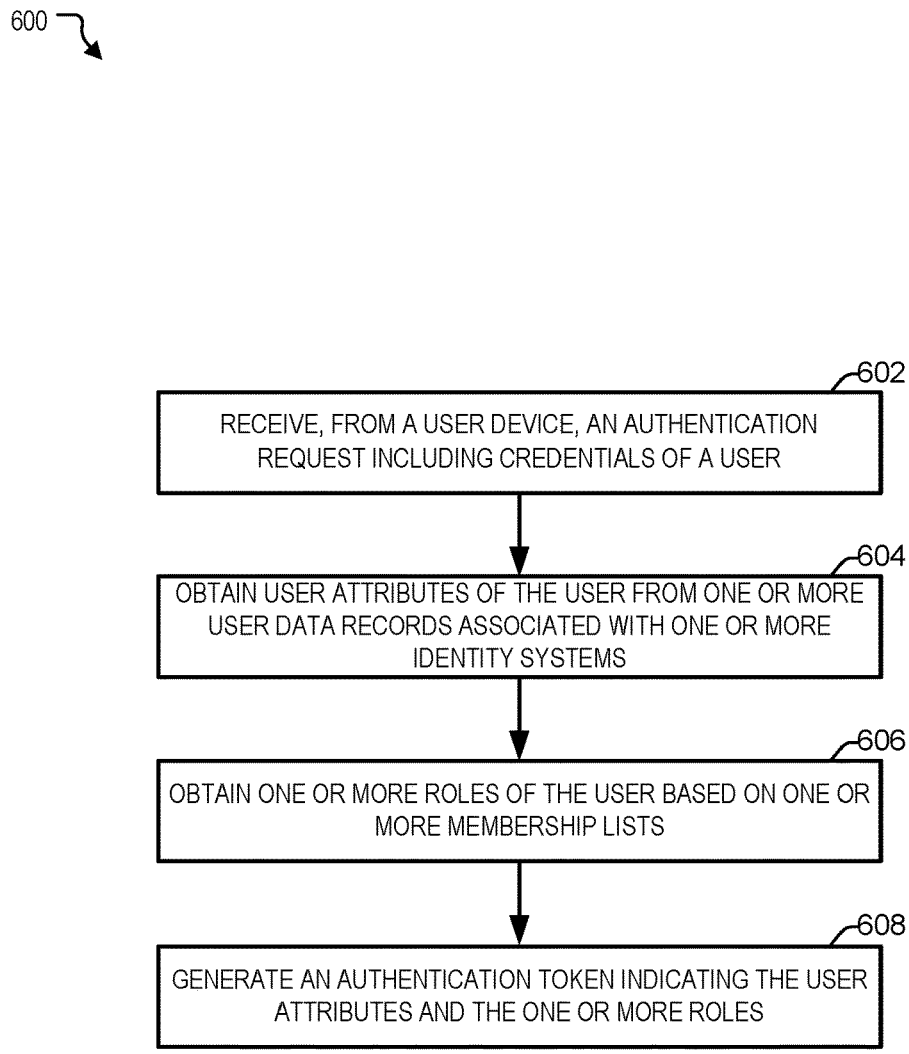
FIG. 6 is a diagram that illustrates a flow chart of an example of a method of hybrid authentication.

Referring to FIG. 6, a particular implementation of a method 600 of hybrid authentication is shown. In a particular aspect, one or more operations of the method 600 are performed by at least one of the API gateway 102, the authorization service 190, the service registry 170, the session management service 194, the one or more identity systems 230, the one or more membership lists 236, or a combination thereof.

The method 600 includes receiving, from a user device, an authentication request including credentials of a user, at 602. For example, the API gateway 102 receives from a user device 220, an authentication request 122 including the credentials 103 of the user 201, as described with reference to FIG. 2.

The method 600 also includes obtaining user attributes of the user from one or more user data records associated with one or more identity systems, at 604. For example, the API gateway 102 obtains the user attributes 234 of the user 201 from the one or more user data records 212 associated with the one or more identity systems 230, as described with reference to FIG. 2.

The method 600 further includes obtaining one or more roles of the user based on one or more membership lists, at 606. For example, the API gateway 102 obtains the one or more user roles 214 of the user 201 based on the one or more membership lists 236.

The method 600 also includes generating an authentication token indicating the user attributes and the one or more roles, at 608. For example, the API gateway 102 generates an authentication token 150 (e.g., a hybrid authentication token) indicating the user attributes 234 and the one or more user roles 214, as described with reference to FIG. 2.

A single hybrid authentication token (e.g., the authentication token 150) can thus be used to enable access to multiple of the services 140 that have different authentication criteria. A technical advantage of the hybrid authentication token can thus include using fewer resources to maintain a single authentication token instead of separate authentication tokens per authentication criterion.

Figure 7:
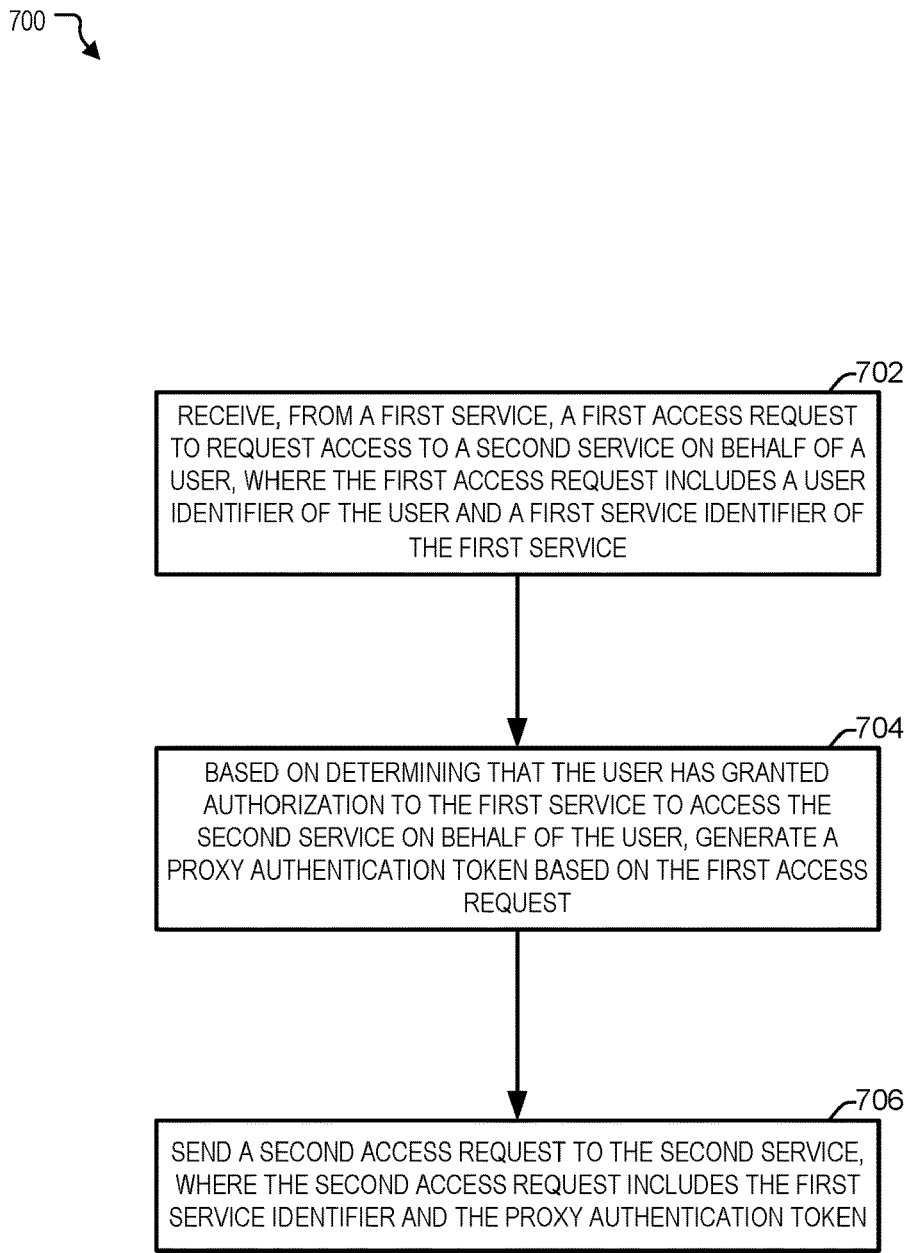
FIG. 7 is a diagram that illustrates a flow chart of an example of a method of proxy authentication.

Referring to FIG. 7, a particular implementation of a method 700 of proxy authentication is shown. In a particular aspect, one or more operations of the method 700 are performed by at least one of the API gateway 102, the authorization service 190, the service registry 170, the session management service 194, or a combination thereof.

The method 700 includes receiving, from a first service, a first access request to request access to a second service on behalf of a user, at 702. For example, the API gateway 102 receives, from the service 140A, an access request 162B to request access to the service 140B on behalf of the user 201, as described with reference to FIG. 3. The access request 162B includes a user identifier (e.g., the requestor identifier 105) of the user 201 and a service identifier 240A of the service 140A.

The method 700 also includes, based on determining that the user has granted authorization to the first service to access the second service on behalf of the user, generate a proxy authentication token based on the first access request, at 704. For example, the API gateway 102, based on determining that the user 201 has granted authorization to the service 140A to access the service 140B on behalf of the user 201, generates a proxy authentication token 350 based on the access request 162B, as described with reference to FIG. 3.

The method 700 further includes sending a second access request to the second service, at 706. For example, the API gateway 102 sends an access request 162C to the service 140B. The access request 162C includes the service identifier 240A and the proxy authentication token 350.

In some aspects, the service 140B is accessible by the user 201 using second credentials. Because an identity of the user 201 has already been verified using the credentials 103 associated with the service 140A, access to the service 140B can be provided independently of verifying the identity of the user 201 based on the second credentials. A technical advantage of the proxy authentication token 350 can thus include not having to provide the second credentials to the service 140A for the service 140A to access the service 140B on behalf of the user 201.

Figure 8:
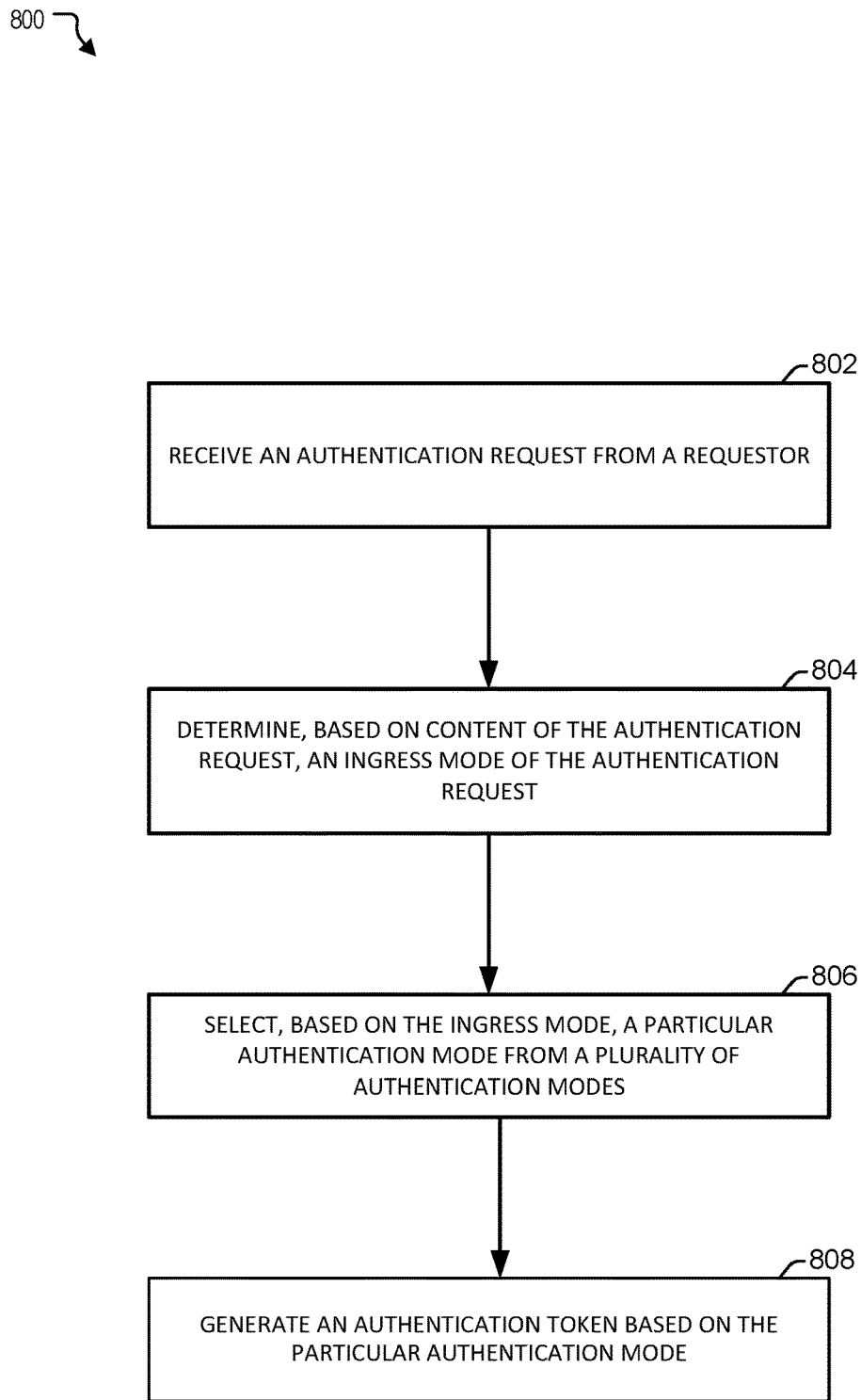
FIG. 8 is a diagram that illustrates a flow chart of an example of a method of ingress mode based authentication.

Referring to FIG. 8, a particular implementation of a method 800 of ingress mode based is shown. In a particular aspect, one or more operations of the method 800 are performed by at least one of the API gateway 102, the authorization service 190, the service registry 170, the session management service 194, or a combination thereof.

The method 800 includes receiving an authentication request from a requestor, at 802. For example, the API gateway 102 receives the authentication request 122 from the requestor 104, as described with reference to FIG. 4.

The method 800 also includes determining, based on content of the authentication request, an ingress mode of the authentication request, at 804. For example, the API gateway 102 determines, based on content of the authentication request 122, an ingress mode 403 of the authentication request 122, as described with reference to FIG. 4.

The method 800 further includes selecting, based on the ingress mode, a particular authentication mode from a plurality of authentication modes, at 806. For example, the API gateway 102 selects, based on the ingress mode 403, one of the authentication modes 407 as the selected authentication mode 409, as described with reference to FIG. 4.

The method 800 also includes generating an authentication token based on the particular authentication mode, at 808. The API gateway 102 generates an authentication token 150 based on the selected authentication mode 409, as described with reference to FIG. 4.

A technical advantage of having the API gateway 102 using various authentication modes based on detected ingress modes (e.g., as compared to a separate API gateway per ingress mode) can include using fewer resources and providing a similar experience across ingress modes.

Figure 9:
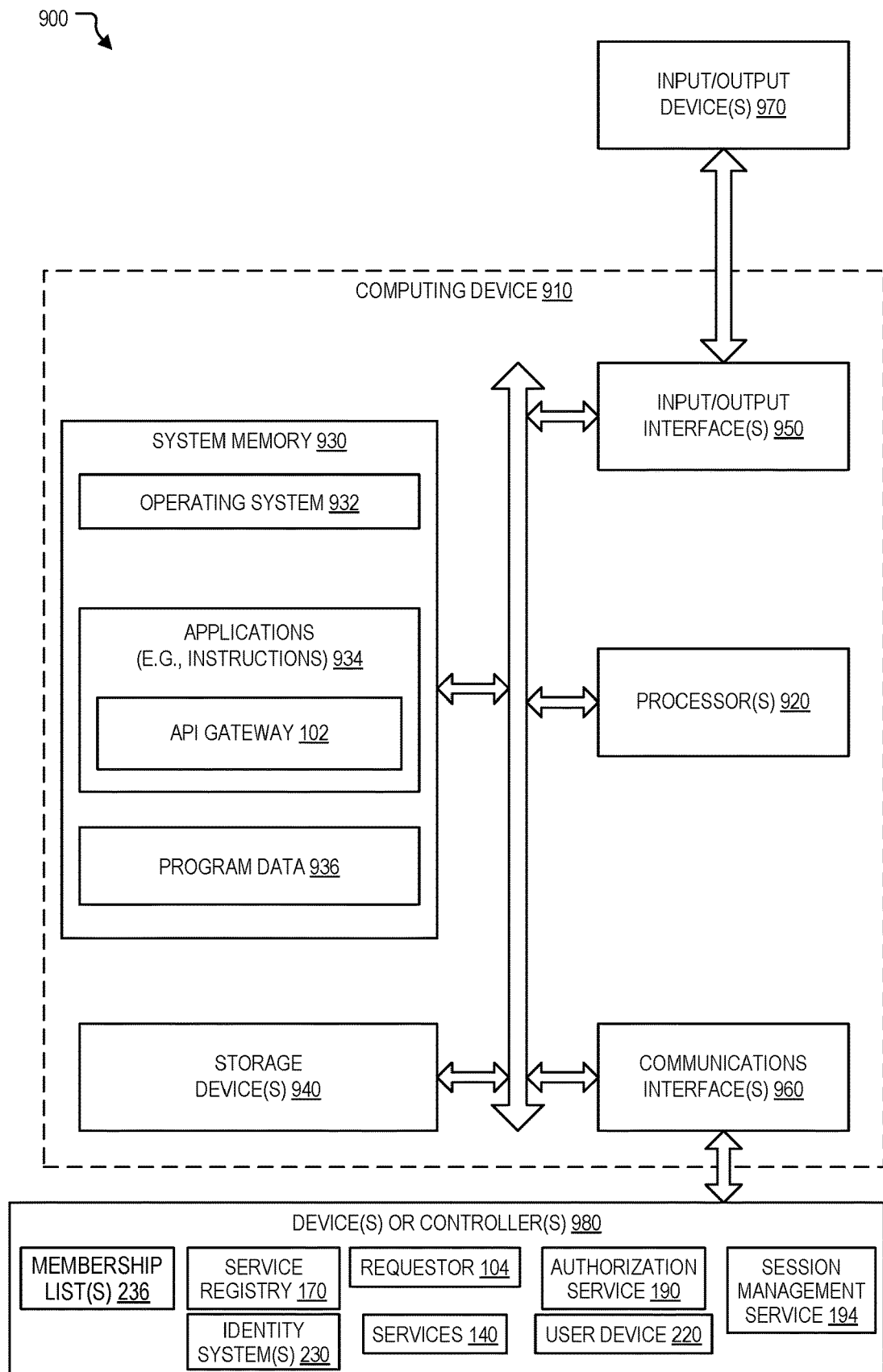
FIG. 9 is a block diagram of a computing environment including a computing device configured to support aspects of computer-implemented methods and computer-executable program instructions (or code) according to the present disclosure.

FIG. 9 is a block diagram of a computing environment 900 including a computing device 910 configured to support aspects of computer-implemented methods and computer-executable program instructions (or code) according to the present disclosure. For example, the computing device 910, or portions thereof, is configured to execute instructions to initiate, perform, or control one or more operations described with reference to FIGS. 1-8.

The computing device 910 includes one or more processors 920. The processor(s) 920 are configured to communicate with system memory 930, one or more storage devices 940, one or more input/output interfaces 950, one or more communications interfaces 960, or any combination thereof. The system memory 930 includes volatile memory devices (e.g., random access memory (RAM) devices), nonvolatile memory devices (e.g., read-only memory (ROM) devices, programmable read-only memory, and flash memory), or both. The system memory 930 stores an operating system 932, which may include a basic input/output system for booting the computing device 910 as well as a full operating system to enable the computing device 910 to interact with users, other programs, and other devices. The system memory 930 stores system (program) data 936, such as data used or generated by the API gateway 102, as described with reference to FIGS. 1-8.

The system memory 930 includes one or more applications 934 (e.g., sets of instructions) executable by the processor(s) 920. As an example, the one or more applications 934 include instructions executable by the processor(s) 920 to initiate, control, or perform one or more operations described with reference to FIGS. 1-8. To illustrate, the one or more applications 934 include instructions executable by the processor(s) 920 to initiate, control, or perform one or more operations described with reference to the API gateway 102, the session management service 194, the authorization service 190, the service registry 170, the services 140, the one or more identity systems 230, the one or more membership lists 236, or a combination thereof.

In some implementations, the processor(s) 920 includes the API gateway 102 that can be implemented at least in part by the processor(s) 920 executing instructions. The processor(s) 920 can be implemented as a single processor or as multiple processors, such as in a multi-core configuration, a multi-processor configuration, a distributed computing configuration, a cloud computing configuration, or any combination thereof. In some implementations, one or more portions of the API gateway 102 are implemented by the processor(s) 920 using dedicated hardware, firmware, or a combination thereof.

In a particular implementation, the system memory 930 includes a non-transitory, computer readable medium storing the instructions that, when executed by the processor(s) 920, cause the processor(s) 920 to initiate, perform, or control operations to perform short-lived authentication. The operations include receiving an authentication request (e.g., the authentication request 122) indicating credentials (e.g., the credentials 103) of a requestor (e.g., the requestor 104). The operations also include determining, based on the credentials, whether the requestor is authorized. The operations further include, responsive to determining that the requestor is authorized, generating a first authentication token (e.g., the authentication token 150A). The operations also include, responsive to determining that the first authentication token has expired, determining whether the requestor remains authorized based on the credentials. The operations further include, responsive to determining that the requestor remains authorized, generating a second authentication token (e.g., the authentication token 150B).

In a particular implementation, the system memory 930 includes a non-transitory, computer readable medium storing the instructions that, when executed by the processor(s) 920, cause the processor(s) 920 to initiate, perform, or control operations to perform hybrid authentication. The operations include receiving, from a user device (e.g., the user device 220), an authentication request (e.g., the authentication request 122) including credentials (e.g., the credentials 103) of a user (e.g., the user 201). The operations also include obtaining user attributes (e.g., the user attributes 234) of the user from one or more user data records (e.g., the one or more user data records 212) associated with one or more identity systems (e.g., the one or more identity systems 230). The operations further include obtaining one or more roles (e.g., the one or more user roles 214) of the user based on one or more membership lists (e.g., the one or more membership lists 236). The operations also include generating an authentication token (e.g., the authentication token 150) indicating the user attributes and the one or more roles.

In a particular implementation, the system memory 930 includes a non-transitory, computer readable medium storing the instructions that, when executed by the processor(s) 920, cause the processor(s) 920 to initiate, perform, or control operations to perform proxy authentication. The operations include receiving, from a first service (e.g., the service 140A), a first access request (e.g., the access request 162B) to request access to a second service (e.g., the service 140B) on behalf of a user (e.g., the user 201), where the first access request includes a user identifier (e.g., the requestor identifier 105) of the user and a first service identifier (e.g., the service identifier 240A) of the first service. The operations also include, based on determining that the user has granted authorization to the first service to access the second service on behalf of the user, generating a proxy authentication token (e.g., the proxy authentication token 350) based on the first access request. The operations further include sending a second access request (e.g., the access request 162C) to the second service, where the second access request includes the first service identifier and the proxy authentication token.

In a particular implementation, the system memory 930 includes a non-transitory, computer readable medium storing the instructions that, when executed by the processor(s) 920, cause the processor(s) 920 to initiate, perform, or control operations to perform ingress mode based authentication. The operations include receiving an authentication request (e.g., the authentication request 122) from a requestor (e.g., the requestor 104). The operations also include determining, based on content of the authentication request, an ingress mode (e.g., the ingress mode 403) of the authentication request. The operations further include selecting, based on the ingress mode, a particular authentication mode (e.g., the selected authentication mode 409) from a plurality of authentication modes (e.g., the authentication modes 407). The operations also include generating an authentication token (e.g., the authentication token 150) based on the particular authentication mode.

The one or more storage devices 940 include nonvolatile storage devices, such as magnetic disks, optical disks, or flash memory devices. In a particular example, the storage devices 940 include both removable and non-removable memory devices. The storage devices 940 are configured to store an operating system, images of operating systems, applications (e.g., one or more of the applications 934), and program data (e.g., the program data 936). In a particular aspect, the system memory 930, the storage devices 940, or both, include tangible computer-readable media. In a particular aspect, one or more of the storage devices 940 are external to the computing device 910.

The one or more input/output interfaces 950 enable the computing device 910 to communicate with one or more input/output devices 970 to facilitate user interaction. For example, the one or more input/output interfaces 950 can include a display interface, an input interface, or both. For example, the input/output interface 950 is adapted to receive input from a user, to receive input from another computing device, or a combination thereof. To illustrate, the input/output interface 950 is adapted to receive input from the requestor 104. In some implementations, the input/output interface 950 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 970 includes one or more user interface devices and displays, including some combination of buttons, keyboards, pointing devices, displays, speakers, microphones, touch screens, and other devices.

The processor(s) 920 are configured to communicate with devices or controllers 980 via the one or more communications interfaces 960. For example, the one or more communications interfaces 960 can include a network interface. The devices or controllers 980 can include, for example, the requestor 104, the services 140, the service registry 170, the authorization service 190, the session management service 194, the user device 220, the one or more identity systems 230, the one or more membership lists 236, one or more other devices, or any combination thereof.

In conjunction with the described systems and methods, an apparatus for performing short-lived authentication is disclosed that includes means for receiving an authentication request indicating credentials of a requestor. In some implementations, the means for receiving corresponds to the API gateway 102, the one or more communication interfaces 960, the processor(s) 920, one or more other circuits or devices configured to receive an authentication request, or a combination thereof.

The apparatus also includes means for determining, based on the credentials, whether the requestor is authorized. For example, the means for determining corresponds to the API gateway 102, the authorization service 190, the processor(s) 920, one or more other circuits or devices configured to determine whether the requestor is authorized based on the credentials, or a combination thereof.

The apparatus further includes means for generating a first authentication token responsive to determining that the requestor is authorized. For example, the means for generating the first authentication token corresponds to the API gateway 102, the processor(s) 920, one or more other circuits or devices configured to generate a first authentication token, or a combination thereof.

The apparatus also includes means for performing a determination whether the requestor remains authorized based on the credentials, the determination responsive to determining that the first authentication token has expired. For example, the means for performing the determination corresponds to the API gateway 102, the authorization service 190, the processor(s) 920, one or more other circuits or devices configured to determine whether the requestor remains authorized based on the credentials, or a combination thereof.

The apparatus further includes generating a second authentication token responsive to determining that the requestor remains authorized. For example, the means for generating the second authentication token corresponds to the API gateway 102, the processor(s) 920, one or more other circuits or devices configured to generate a second authentication token, or a combination thereof.

In conjunction with the described systems and methods, an apparatus for performing hybrid authentication is disclosed that includes means for receiving, from a user device, an authentication request including credentials of a user. In some implementations, the means for receiving corresponds to the API gateway 102, the one or more communication interfaces 960, the processor(s) 920, one or more other circuits or devices configured to receive an authentication request, or a combination thereof.

The apparatus also includes means for obtaining user attributes of the user from one or more user data records associated with one or more identity systems. For example, the means for obtaining the user attributes corresponds to the API gateway 102, the one or more identity systems 230, the processor(s) 920, one or more other circuits or devices configured to obtain the user attributes, or a combination thereof.

The apparatus further includes means for obtaining one or more roles of the user based on one or more membership lists. For example, the means for obtaining the one or more roles corresponds to the API gateway 102, the one or more membership lists 236, the processor(s) 920, one or more other circuits or devices configured to obtain the one or more roles, or a combination thereof.

The apparatus also includes means for generating an authentication token indicating the user attributes and the one or more roles. For example, the means for generating the authentication token corresponds to the API gateway 102, the processor(s) 920, one or more other circuits or devices configured to generate an authentication token indicating the user attributes and the one or more roles, or a combination thereof.

In conjunction with the described systems and methods, an apparatus for performing proxy authentication is disclosed that includes means for receiving, from a first service, a first access request to request access to a second service on behalf of a user, where the first access request includes a user identifier of the user and a first service identifier of the first service. In some implementations, the means for receiving corresponds to the API gateway 102, the one or more communication interfaces 960, the processor(s) 920, one or more other circuits or devices configured to receive an access request, or a combination thereof.

The apparatus also includes means for generating a proxy authentication token based on the first access request, the proxy authentication token generated based on determining that the user has granted authorization to the first service to access the second service on behalf of the user. For example, the means for generating the proxy authentication token corresponds to the API gateway 102, the processor(s) 920, one or more other circuits or devices configured to generate a proxy authentication token, or a combination thereof.

The apparatus further includes means for sending a second access request to the second service, wherein the second access request includes the first service identifier and the proxy authentication token. For example, the means for sending the second access request corresponds to the API gateway 102, the processor(s) 920, one or more other circuits or devices configured to send the second access request, or a combination thereof.

In conjunction with the described systems and methods, an apparatus for performing ingress mode based authentication is disclosed that includes means for receiving an authentication request from a requestor. In some implementations, the means for receiving corresponds to the API gateway 102, the one or more communication interfaces 960, the processor(s) 920, one or more other circuits or devices configured to receive an authentication request, or a combination thereof.

The apparatus also includes means for determining, based on content of the authentication request, an ingress mode of the authentication request. For example, the means for determining corresponds to the API gateway 102, the processor(s) 920, one or more other circuits or devices configured to determining the ingress mode, or a combination thereof.

The apparatus further includes selecting, based on the ingress mode, a particular authentication mode from a plurality of authentication modes. For example, the means for selecting corresponds to the API gateway 102, the processor(s) 920, one or more other circuits or devices configured to select the particular authentication mode, or a combination thereof.

The apparatus also includes generating an authentication token based on the particular authentication mode. For example, the means for generating the authentication token corresponds to the API gateway 102, the processor(s) 920, one or more other circuits or devices configured to generate the authentication token, or a combination thereof.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-9. In some implementations, part or all of one or more of the operations or methods of FIGS. 1-9 may be implemented by one or more processors (e.g., one or more central processing units (CPUs), one or more graphics processing units (GPUs), one or more digital signal processors (DSPs)) executing instructions, by dedicated hardware circuitry, or any combination thereof.

Particular aspects of the disclosure are described below in sets of interrelated Examples:

According to Example 1, a device includes one or more processors configured to receive an authentication request indicating credentials of a requestor; determine, based on the credentials, whether the requestor is authorized; responsive to determining that the requestor is authorized, generate a first authentication token; responsive to determining that the first authentication token has expired, determine whether the requestor remains authorized based on the credentials; and responsive to determining that the requestor remains authorized, generate a second authentication token.

Example 2 includes the device of Example 1, wherein the requestor includes a user, and wherein the credentials are based on a user identifier of the user.

Example 3 includes the device of Example 1 or Example 2, wherein the requestor includes a second device, and wherein the credentials are based on a device identifier of the second device.

Example 4 includes the device of Example 3, wherein the credentials include a certificate.

Example 5 includes the device of any of Examples 1 to 4, wherein the one or more processors are configured to assign an expiration time to the first authentication token when generating the first authentication token.

Example 6 includes the device of any of Examples 1 to 5, wherein the one or more processors are configured to: responsive to determining that the first authentication token has not expired, send a first data request to a service, the first data request including the first authentication token; receive first data responsive to the first data request; and send the first data to the requestor.

Example 7 includes the device of Example 6, wherein the one or more processors are configured to, subsequent to sending the first data to the requestor: responsive to determining that the first authentication token has expired and that the second authentication token has not expired, send a second data request to the service, the second data request including the second authentication token; receive second data responsive to the second data request; and send the second data to the requestor.

According to Example 8, a method includes receiving, at a device, an authentication request indicating credentials of a requestor; determining, based on the credentials, whether the requestor is authorized; responsive to determining that the requestor is authorized, generating a first authentication token; responsive to determining that the first authentication token has expired, determining whether the requestor remains authorized based on the credentials; and responsive to determining that the requestor remains authorized, generating a second authentication token.

Example 9 includes the method of Example 8, wherein the requestor includes a user, and wherein the credentials are based on a user identifier of the user.

Example 10 includes the method of Example 8 or Example 9, wherein the requestor includes a second device, and wherein the credentials are based on a device identifier of the second device.

Example 11 includes the method of Example 10, wherein the credentials include a certificate.

Example 12 includes the method of any of Examples 8 to 11, wherein generating the first authentication token includes assigning an expiration time to the first authentication token.

Example 13 includes the method of any of Examples 8 to 12, further includes responsive to determining that the first authentication token has not expired, sending a first data request to a service, the first data request including the first authentication token; receiving first data responsive to the first data request; and sending the first data to the requestor.

Example 14 includes the method of Example 13, further comprising, subsequent to sending the first data to the requestor: responsive to determining that the first authentication token has expired and that the second authentication token has not expired, sending a second data request to the service, the second data request including the second authentication token; receiving second data responsive to the second data request; and sending the second data to the requestor.

According to Example 15, a device includes: a memory configured to store instructions; and a processor configured to execute the instructions to perform the method of any of Examples 8 to 14.

According to Example 16, a non-transitory computer-readable medium stores instructions that, when executed by a processor, cause the processor to perform the method of any of Examples 8 to 14.

According to Example 17, an apparatus includes means for carrying out the method of any of Examples 8 to 14.

According to Example 18, a non-transitory computer-readable medium stores instructions that, when executed by one or more processors, cause the one or more processors to: receive an authentication request indicating credentials of a requestor; determine, based on the credentials, whether the requestor is authorized; responsive to determining that the requestor is authorized, generate a first authentication token; responsive to determining that the first authentication token has expired, determine whether the requestor remains authorized based on the credentials; and responsive to determining that the requestor remains authorized, generate a second authentication token.

Example 19 includes the non-transitory computer-readable medium of Example 18, wherein the requestor includes a user, and wherein the credentials are based on a user identifier of the user.

Example 20 includes the non-transitory computer-readable medium of Example 18 or Example 19, wherein the requestor includes a device, and wherein the credentials are based on a device identifier of the device.

Example 21 includes the non-transitory computer-readable medium of Example 20, wherein the credentials include a certificate.

Example 22 includes the non-transitory computer-readable medium of any of Examples 18 to 21, wherein the instructions, when executed by the one or more processors, cause the one or more processors to: responsive to determining that the first authentication token has not expired, send a first data request to a service, the first data request including the first authentication token; receive first data responsive to the first data request; and send the first data to the requestor.

Example 23 includes the non-transitory computer-readable medium of Example 22, wherein the one or more processors are configured to, subsequent to sending the first data to the requestor: responsive to determining that the first authentication token has expired and that the second authentication token has not expired, send a second data request to the service, the second data request including the second authentication token; receive second data responsive to the second data request; and send the second data to the requestor.

According to Example 24, a device includes one or more processors configured to receive, from a user device, an authentication request including credentials of a user; obtain user attributes of the user from one or more user data records associated with one or more identity systems; obtain one or more roles of the user based on one or more membership lists; and generate an authentication token indicating the user attributes and the one or more roles.

Example 25 includes the device of Example 24, wherein the authentication token includes a digital signature.

Example 26 includes the device of Example 25, wherein the digital signature is based on a private key.

Example 27 includes the device of any of Examples 24 to 26, wherein the one or more processors are further configured to associate the authentication token with a session of the user.

Example 28 includes the device of any of Examples 24 to 27, wherein the one or more processors are further configured to: send a first data request to a first service, the first data request including the authentication token; receive first data responsive to the first data request; and send the first data to the user device.

Example 29 includes the device of Example 28, wherein the first service is a rule-based service configured to provide access to the first data based on the one or more roles independently of the user attributes.

Example 30 includes the device of Example 29, wherein the one or more processors are further configured to: send a second data request to a second service, the second data request including the authentication token; receive second data responsive to the second data request; and send the second data to the user device.

Example 31 includes the device of Example 30, wherein the second service is an attribute-based service configured to provide access to the second data based on the user attributes independently of the one or more roles.

Example 32 includes the device of any of Examples 24 to 31, wherein the one or more user data records and the one or more membership lists are associated with two or more business entities.

According to Example 33, a method includes receiving, from a user device, an authentication request including credentials of a user; obtaining user attributes of the user from one or more user data records associated with one or more identity systems; obtaining one or more roles of the user based on one or more membership lists; and generating an authentication token indicating the user attributes and the one or more roles.

Example 34 includes the method of Example 33, wherein the authentication token includes a digital signature.

Example 35 includes the method of Example 34, wherein the digital signature is based on a private key.

Example 36 includes the method of any of Examples 33 to 35, further comprising associating the authentication token with a session of the user.

Example 37 includes the method of any of Examples 33 to 36, further includes sending a first data request to a first service, the first data request including the authentication token; receiving first data responsive to the first data request; and sending the first data to the user device.

Example 38 includes the method of Example 37, wherein the first service is a rule-based service configured to provide access to the first data based on the one or more roles independently of the user attributes.

Example 39 includes the method of Example 38, further includes sending a second data request to a second service, the second data request including the authentication token; receiving second data responsive to the second data request; and sending the second data to the user device.

Example 40 includes the method of Example 39, wherein the second service is an attribute-based service configured to provide access to the second data based on the user attributes independently of the one or more roles.

Example 41 includes the method of any of Examples 33 to 40, wherein the one or more user data records and the one or more membership lists are associated with two or more business entities.

According to Example 42, a device includes: a memory configured to store instructions; and a processor configured to execute the instructions to perform the method of any of Examples 33 to 41.

According to Example 43, a non-transitory computer-readable medium stores instructions that, when executed by a processor, cause the processor to perform the method of any of Examples 33 to 41.

According to Example 44, an apparatus includes means for carrying out the method of any of Examples 33 to 41.

According to Example 45, a non-transitory computer-readable medium stores instructions that, when executed by one or more processors, cause the one or more processors to: receive, from a user device, an authentication request including credentials of a user; obtain user attributes of the user from one or more user data records associated with one or more identity systems; obtain one or more roles of the user based on one or more membership lists; and generate an authentication token indicating the user attributes and the one or more roles.

Example 46 includes the non-transitory computer-readable medium of Example 45, wherein the authentication token includes a digital signature.

According to Example 47, a device includes one or more processors configured to receive, from a first service, a first access request to request access to a second service on behalf of a user, wherein the first access request includes a user identifier of the user and a first service identifier of the first service; based on determining that the user has granted authorization to the first service to access the second service on behalf of the user, generate a proxy authentication token based on the first access request; and send a second access request to the second service, wherein the second access request includes the first service identifier and the proxy authentication token.

Example 48 includes the device of Example 47, wherein the one or more processors are configured to generate the proxy authentication token based on determining that the authorization is granted by the user prior to receipt of the first access request.

Example 49 includes the device of Example 47 or Example 48, wherein the one or more processors are configured to generate the proxy authentication token further based on determining that the user is an authorized user of the second service.

Example 50 includes the device of any of Examples 47 to 49, wherein the one or more processors are configured to: send an authorization request to an authorization service, the authorization request indicating the user identifier and a second service identifier of the second service; and generate the proxy authentication token further based on receiving an authorization response indicating that the user is an authorized user of the second service.

Example 51 includes the device of any of Examples 47 to 50, wherein the one or more processors are configured to: receive data from the second service responsive to the second access request; and send the data to the first service.

Example 52 includes the device of any of Examples 47 to 51, wherein the proxy authentication token indicates the user identifier and the first service identifier.

Example 53 includes the device of any of Examples 47 to 52, wherein the one or more processors are further configured to assign an expiration time to the proxy authentication token.

According to Example 54, a method includes receiving, from a first service, a first access request to request access to a second service on behalf of a user, wherein the first access request includes a user identifier of the user and a first service identifier of the first service; based on determining that the user has granted authorization to the first service to access the second service on behalf of the user, generating a proxy authentication token based on the first access request; and sending a second access request to the second service, wherein the second access request includes the first service identifier and the proxy authentication token.

Example 55 includes the method of Example 54, further comprising determining that the authorization is granted by the user prior to receipt of the first access request.

Example 56 includes the method of Example 54 or Example 55, wherein generating the proxy authentication token is further based on determining that the user is an authorized user of the second service.

Example 57 includes the method of any of Examples 54 to 56, further includes sending an authorization request to an authorization service, the authorization request indicating the user identifier and a second service identifier of the second service; and generating the proxy authentication token further based on receiving an authorization response indicating that the user is an authorized user of the second service.

Example 58 includes the method of any of Examples 54 to 57, further includes receiving data from the second service responsive to the second access request, and sending the data to the first service.

Example 59 includes the method of any of Examples 54 to 58, wherein the proxy authentication token indicates the user identifier and the first service identifier.

Example 60 includes the method of any of Examples 54 to 59, further comprising assigning an expiration time to the proxy authentication token.

According to Example 61, a device includes: a memory configured to store instructions; and a processor configured to execute the instructions to perform the method of any of Examples 54 to 60.

According to Example 62, a non-transitory computer-readable medium stores instructions that, when executed by a processor, cause the processor to perform the method of any of Examples 54 to 60.

According to Example 63, an apparatus includes means for carrying out the method of any of Examples 54 to 60.

According to Example 64, a non-transitory computer-readable medium stores instructions that, when executed by one or more processors, cause the one or more processors to: receive, from a first service, a first access request to request access to a second service on behalf of a user, wherein the first access request includes a user identifier of the user and a first service identifier of the first service; based on determining that the user has granted authorization to the first service to access the second service on behalf of the user, generate a proxy authentication token based on the first access request; and send a second access request to the second service, wherein the second access request includes the first service identifier and the proxy authentication token.

Example 65 includes the non-transitory computer-readable medium of Example 64, wherein the instructions, when executed by the one or more processors, cause the one or more processors to generate the proxy authentication token based on determining that the authorization is granted by the user prior to receipt of the first access request.

Example 66 includes the non-transitory computer-readable medium of Example 64 or Example 65, wherein the instructions, when executed by the one or more processors, cause the one or more processors to generate the proxy authentication token further based on determining that the user is an authorized user of the second service.

Example 67 includes the non-transitory computer-readable medium of any of Examples 64 to 66, wherein the instructions, when executed by the one or more processors, cause the one or more processors to: send an authorization request to an authorization service, the authorization request indicating the user identifier and a second service identifier of the second service; and generate the proxy authentication token further based on receiving an authorization response indicating that the user is an authorized user of the second service.

Example 68 includes the non-transitory computer-readable medium of any of Examples 64 to 67, wherein the instructions, when executed by the one or more processors, cause the one or more processors to: receive data from the second service responsive to the second access request; and send the data to the first service.

Example 69 includes the non-transitory computer-readable medium of any of Examples 64 to 68, wherein the proxy authentication token indicates the user identifier and the first service identifier.

According to Example 70, a device includes one or more processors configured to receive an authentication request from a requestor; determine, based on content of the authentication request, an ingress mode of the authentication request; select, based on the ingress mode, a particular authentication mode from a plurality of authentication modes; and generate an authentication token based on the particular authentication mode.

Example 71 includes the device of Example 70, wherein the ingress mode corresponds to a first ingress mode when the authentication request is generated at a first network, and wherein the ingress mode corresponds to a second ingress mode when the authentication request is generated at a second network.

Example 72 includes the device of Example 70 or Example 71, wherein the ingress mode corresponds to a first ingress mode when the authentication request is user-specific, and wherein the ingress mode corresponds to a second ingress mode when the authentication request is not user-specific.

Example 73 includes the device of any of Examples 70 to 72, wherein the plurality of authentication modes includes at least two of a first authentication mode based on a user identifier and a password, a second authentication mode based on a first certificate, a third authentication mode based on a second certificate and an access portal identity token, a fourth authentication mode based on a third certificate, a web service gateway identifier, and a web service gateway user identifier, or a fifth authentication mode based on a fourth certificate and a proxy authentication token for a user.

Example 74 includes the device of any of Examples 70 to 73, wherein the plurality of authentication modes includes at least a first authentication mode based on a user identifier and a password, and a second authentication mode based on a certificate.

Example 75 includes the device of any of Examples 70 to 74, wherein the plurality of authentication modes includes at least two of a first authentication mode based on a first certificate and an access portal identity token, a second authentication mode based on a second certificate, a web service gateway identifier, and a web service gateway user identifier, and a third authentication mode based on a third certificate and a proxy authentication token for a user.

Example 76 includes the device of any of Examples 70 to 75, wherein the one or more processors are further configured to: send a data request to a service, the data request including the authentication token; receive data responsive to the data request; and send the data to the requestor.

According to Example 77, a method includes receiving, at a device, an authentication request from a requestor; determining, based on content of the authentication request, an ingress mode of the authentication request; selecting, based on the ingress mode, a particular authentication mode from a plurality of authentication modes; and generating, at the device, an authentication token based on the particular authentication mode.

Example 78 includes the method of Example 77, wherein the ingress mode corresponds to a first ingress mode when the authentication request is generated at a first network, and wherein the ingress mode corresponds to a second ingress mode when the authentication request is generated at a second network.

Example 79 includes the method of Example 77 or Example 78, wherein the ingress mode corresponds to a first ingress mode when the authentication request is user-specific, and wherein the ingress mode corresponds to a second ingress mode when the authentication request is not user-specific.

Example 80 includes the method of any of Examples 77 to 79, wherein the plurality of authentication modes includes at least two of a first authentication mode based on a user identifier and a password, a second authentication mode based on a first certificate, a third authentication mode based on a second certificate and an access portal identity token, a fourth authentication mode based on a third certificate, a web service gateway identifier, and a web service gateway user identifier, or a fifth authentication mode based on a fourth certificate and a proxy authentication token for a user.

Example 81 includes the method of any of Examples 77 to 80, wherein the plurality of authentication modes includes at least a first authentication mode based on a user identifier and a password, and a second authentication mode based on a certificate.

Example 82 includes the method of any of Examples 77 to 81, wherein the plurality of authentication modes includes at least two of a first authentication mode based on a first certificate and an access portal identity token, a second authentication mode based on a second certificate, a web service gateway identifier, and a web service gateway user identifier, and a third authentication mode based on a third certificate and a proxy authentication token for a user.

Example 83 includes the method of any of Examples 77 to 82, further includes sending a data request from the device to a service, the data request including the authentication token; receiving, at the device, data responsive to the data request; and sending the data from the device to the requestor.

According to Example 84, a device includes: a memory configured to store instructions; and a processor configured to execute the instructions to perform the method of any of Examples 77 to 83.

According to Example 85, a non-transitory computer-readable medium stores instructions that, when executed by a processor, cause the processor to perform the method of any of Examples 77 to 83.

According to Example 86, an apparatus includes means for carrying out the method of any of Examples 77 to 83.

According to Example 87, a non-transitory computer-readable medium stores instructions that, when executed by one or more processors, cause the one or more processors to: receive an authentication request from a requestor; determine, based on content of the authentication request, an ingress mode of the authentication request; select, based on the ingress mode, a particular authentication mode from a plurality of authentication modes; and generate an authentication token based on the particular authentication mode.

Example 88 includes the non-transitory computer-readable medium of Example 87, wherein the ingress mode corresponds to a first ingress mode when the authentication request is generated at a first network, and wherein the ingress mode corresponds to a second ingress mode when the authentication request is generated at a second network.

Example 89 includes the non-transitory computer-readable medium of Example 87 or Example 88, wherein the ingress mode corresponds to a first ingress mode when the authentication request is user-specific, and wherein the ingress mode corresponds to a second ingress mode when the authentication request is not user-specific.

Example 90 includes the non-transitory computer-readable medium of any of Examples 87 to 89, wherein the plurality of authentication modes includes at least two of a first authentication mode based on a user identifier and a password, a second authentication mode based on a first certificate, a third authentication mode based on a second certificate and an access portal identity token, a fourth authentication mode based on a third certificate, a web service gateway identifier, and a web service gateway user identifier, or a fifth authentication mode based on a fourth certificate and a proxy authentication token for a user.

Example 91 includes the non-transitory computer-readable medium of any of Examples 87 to 90, wherein the plurality of authentication modes includes at least a first authentication mode based on a user identifier and a password, and a second authentication mode based on a certificate.

Example 92 includes the non-transitory computer-readable medium of any of Examples 87 to 91, wherein the plurality of authentication modes includes at least two of a first authentication mode based on a first certificate and an access portal identity token, a second authentication mode based on a second certificate, a web service gateway identifier, and a web service gateway user identifier, and a third authentication mode based on a third certificate and a proxy authentication token for a user.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device comprising:
   one or more processors configured to:
      receive, from a user device, an authentication request including credentials of a user;
      obtain user attributes of the user from one or more user data records associated with one or more identity systems;
      obtain one or more roles of the user based on one or more membership lists, wherein each of the one or more membership lists is associated with a respective role, and wherein a particular membership list includes a user identifier of the user to indicate that the user has a particular role that is associated with the particular membership list;
      generate an authentication token indicating the user attributes and the one or more roles, the one or more roles distinct from the user attributes, wherein the authentication token includes a digital signature, and wherein the digital signature is based on a private key;
      send, to an attribute-based service, a first access request that includes the authentication token, wherein the attribute-based service is configured to selectively provide access based on the user attributes indicated by the authentication token and independently of the one or more roles; and
      send, to a role-based service, a second access request that includes the authentication token, wherein the role-based service is configured to selectively provide access based on the one or more roles indicated by the authentication token and independently of the user attributes.

2. The device of claim 1, wherein the one or more processors are further configured to associate the authentication token with a session of the user.

3. The device of claim 1, wherein the one or more processors are further configured to:
   receive first data responsive to the first access request; and
   send the first data to the user device.

4. The device of claim 1, wherein the one or more processors are further configured to:
   receive second data responsive to the second access request; and
   send the second data to the user device.

5. The device of claim 1, wherein the device is a singular device.

6. The device of claim 1, wherein the one or more user data records and the one or more membership lists are associated with two or more business entities.

7. A method comprising:
   receiving, from a user device, an authentication request including credentials of a user;
   obtaining user attributes of the user from one or more user data records associated with one or more identity systems;
   obtaining one or more roles of the user based on one or more membership lists, wherein each of the one or more membership lists is associated with a respective role, and wherein a particular membership list includes a user identifier of the user to indicate that the user has a particular role that is associated with the particular membership list;
   generating an authentication token indicating the user attributes and the one or more roles, the one or more roles distinct from the user attributes, wherein the authentication token includes a digital signature, and wherein the digital signature is based on a private key;
   sending, to an attribute-based service, a first access request that includes the authentication token, wherein the attribute-based service is configured to selectively provide access based on the user attributes indicated by the authentication token and independently of the one or more roles; and
   send, to a role-based service, a second access request that includes the authentication token, wherein the role-based service is configured to selectively provide access based on the one or more roles indicated by the authentication token and independently of the user attributes.

8. The method of claim 7, further comprising associating the authentication token with a session of the user.

9. The method of claim 7, further comprising:
   receiving first data responsive to the first access request; and sending the first data to the user device.

10. The method of claim 9, further comprising:
receiving second data responsive to the second access request; and
sending the second data to the user device.

11. A non-transitory computer-readable medium storing instructions that, when executed by one or more processors, cause the one or more processors to:
receive, from a user device, an authentication request including credentials of a user;
obtain user attributes of the user from one or more user data records associated with one or more identity systems;
obtain one or more roles of the user based on one or more membership lists, wherein each of the one or more membership lists is associated with a respective role, and wherein a particular membership list includes a user identifier of the user to indicate that the user has a particular role that is associated with the particular membership list;
generate an authentication token indicating the user attributes and the one or more roles, the one or more roles distinct from the user attributes, wherein the authentication token includes a digital signature, and wherein the digital signature is based on a private key;
send, to an attribute-based service, a first access request that includes the authentication token, wherein the attribute-based service is configured to selectively provide access based on the user attributes indicated by the authentication token and independently of the one or more roles; and
send, to a role-based service, a second access request that includes the authentication token, wherein the role-based service is configured to selectively provide access based on the one or more roles indicated by the authentication token and independently of the user attributes.

12. The non-transitory computer-readable medium of claim 11, wherein a first role of the one or more roles is associated with a first context and a second role of the one or more roles is associated with a second context.

13. The device of claim 1, wherein the user attributes include at least one of a country of citizenship or a country of birth of the user.

14. The method of claim 7, wherein receiving the authentication request, obtaining the user attributes, obtaining the one of more roles of the user, sending the first access request, and sending the second access request are performed by one or more processors of a singular device.

15. The non-transitory computer-readable medium of claim 11, wherein the one or more processors are included in a singular device.

* * * * *